(12) United States Patent
Lalicki et al.

(10) Patent No.: US 11,881,069 B2
(45) Date of Patent: Jan. 23, 2024

(54) SECURITY DEVICES AND METHODS FOR REGULATING ACCESS TO ITEMS SECURED WITHIN

(71) Applicant: Vara Corporation, Troy, NY (US)

(72) Inventors: Jorel Lalicki, Watervliet, NY (US); Austin Rivera, Averill Park, NY (US); Timothy Oh, Troy, NY (US); Christine Tate, Waterford, NY (US); Hao Chang, Troy, NY (US)

(73) Assignee: Vara Corporation, Troy, NY (US)

( * ) Notice: Subject to any disclaimer, the term of this patent is extended or adjusted under 35 U.S.C. 154(b) by 197 days.

(21) Appl. No.: 17/073,850

(22) Filed: Oct. 19, 2020

(65) Prior Publication Data

US 2021/0125442 A1 Apr. 29, 2021

Related U.S. Application Data

(60) Provisional application No. 62/927,457, filed on Oct. 29, 2019.

(51) Int. Cl.
| | |
|---|---|
| *G07C 9/37* | (2020.01) |
| *G07C 9/29* | (2020.01) |
| *G06K 7/10* | (2006.01) |
| *G16Y 10/75* | (2020.01) |
| *G16Y 40/50* | (2020.01) |

(Continued)

(52) U.S. Cl.
CPC ........... *G07C 9/37* (2020.01); *G06K 7/10366* (2013.01); *G06V 20/52* (2022.01); *G07C 9/29* (2020.01); *G16Y 10/75* (2020.01); *G16Y 40/50* (2020.01); *G06V 40/12* (2022.01); *G06V 40/15* (2022.01); *G06V 40/166* (2022.01); *G06V 40/40* (2022.01); *G06V 40/70* (2022.01)

(58) Field of Classification Search
CPC .. G07C 9/29; G07C 9/00309; G07C 9/00563; G07C 9/37; G06K 7/10366; G16Y 10/75; G16Y 40/50; G06V 40/13; G06V 40/15; G06V 40/166; G06V 40/70; G06V 20/52; G06V 40/12; G06V 40/40
See application file for complete search history.

(56) References Cited

U.S. PATENT DOCUMENTS

| | | | |
|---|---|---|---|
| 2002/0158095 A1 | 10/2002 | Vor Keller et al. | |
| 2004/0155752 A1* | 8/2004 | Radke | G06V 40/13 340/5.2 |

(Continued)

*Primary Examiner* — James J Yang
(74) *Attorney, Agent, or Firm* — Hoffman Warnick LLC

(57) ABSTRACT

Security devices and methods for regulating access to an item secured within the security device are provided. In an example, the method includes: determining if a requesting user submitting a request to access the item is an authorized user; and in response to determining the requesting user is the authorized user, the method further includes one or more actions of: triggering a predefined wait period; allowing the requesting user access to the item and notifying at least one of a primary user, a designated user, or a third party service; or notifying the at least one of the primary user, the designated user, or the third party service that the requesting user is requesting access to the item, and receiving an approval or a denial of access to the item to the requesting user from at least one of the primary user, the designated user, or the third party service.

19 Claims, 13 Drawing Sheets

(51) Int. Cl.
*G06V 20/52* (2022.01)
*G06V 40/10* (2022.01)
*G06V 40/70* (2022.01)
*G06V 40/16* (2022.01)
*G06V 40/12* (2022.01)
*G06V 40/40* (2022.01)

(56) References Cited

U.S. PATENT DOCUMENTS

| | | | |
|---|---|---|---|
| 2011/0175730 A1* | 7/2011 | Stevenson | E05B 63/0065 340/5.73 |
| 2017/0140594 A1* | 5/2017 | Zastrow | G07C 9/00309 |
| 2018/0070753 A1* | 3/2018 | Eveloff | H04W 4/025 |

* cited by examiner

FIG. 10A  FIG. 10B

SECURITY DEVICES AND METHODS FOR REGULATING ACCESS TO ITEMS SECURED WITHIN

BACKGROUND

The disclosure relates generally to security devices, and more particularly to security devices and methods of regulating operations and/or access to items secured within the security devices.

Security devices provide safe storage against theft and unauthorized access to items stored within. For example, a firearm security device is a primary requirement in most firearm-owning households to protect against theft and unauthorized access. Laws and regulations around safe firearm storage and child prevention access emphasize the presence of a firearm security device in a firearm-owning home. The firearm security device may be used to store the firearm while preventing an unauthorized user from accessing and tampering with the firearm. However, conventional firearm security devices do not provide additional protection to authorized users in certain applications. For example, in the case of a suicidal crisis, an authorized firearm user may easily obtain access to the firearm for conducting suicidal attempts. It has been reported that a duration of the suicidal crisis, that is, an acute period of heightened risk for suicidal behavior, often only lasts between 5 minutes to an hour. Thus, having a firearm security device with enhanced safety features for suicidal crisis management is highly desirable. In another application, a conventional firearm security device may be used as a holster for law enforcement personnel to store and carry their firearm(s) during active duties. However, if a criminal attempts to grab an officer's holstered firearm, the conventional firearm security device is not configured to provide additional protection and/or support to the officer in the field. Therefore, the market is still in need of a security device with enhanced safety features for regulating access to the items stored within the security device.

SUMMARY

An aspect of the disclosure provides a method for regulating access to an item secured within a security device, the method including: determining if a requesting user submitting a request to access the item secured within the security device is an authorized user based on authentication data collected from the requesting user and authentication data corresponding to the authorized user; and in response to determining the requesting user is the authorized user, the method further includes one or more actions of: triggering a predefined wait period during which the access to the item is denied; allowing the requesting user access to the item and notifying at least one of a primary user, a designated user, or a third party service that the item is accessible to the requesting user; or notifying the at least one of the primary user, the designated user, or the third party service that the requesting user is requesting access to the item, and receiving an approval or a denial of access to the item to the requesting user from at least one of the primary user, the designated user, or the third party service.

Another aspect of the disclosure provides a computer-implemented method for regulating access to an item secured within a security device, the method including: activating one or more internet of things (IoT) devices in response to receiving a distress signal predefined to be indicative of an emergency; notifying at least one of a primary user, a designated user, or a third party service that the predefined distress signal is received; receiving an indication from the at least one of the primary user, the designated user, or the third party service, whether the emergency exists; in response to receiving an indication that the emergency exists, notifying an emergency response unit; and in response to receiving an indication that the emergency does not exist, maintaining the security device in a locked configuration to prevent access to the item secured within the security device.

Further aspects of the disclosure provides a security device for securing an item, the security device including: an enclosure including a cavity for storing the item therein; a cover operably coupled to the enclosure and configured to block access to the cavity where the item is stored; a locking mechanism coupled to the cover and the enclosure and configured to secure the cover to the enclosure; an access authentication assembly included within and exposed on the enclosure, and configured to receive or provide authentication data for determining if a requesting user requesting access to the item is an authorized user; a device condition sensor configured to provide device condition data associated with at least one of the security device and an environment in proximity to the security device; and a computing device operably coupled to the locking mechanism, the access authentication assembly, and the device condition sensor, and configured to regulate the security device between a locked configuration where access to the item is denied and an unlocked configuration where the item is accessible.

Still further aspects of the disclosure provide a security holster for securing a firearm, the security holster including: a body including a cavity for receiving the firearm; a locking mechanism extending at least partially into the cavity for selectively securing at least a portion of the firearm within the cavity; an access authentication assembly configured to receive or provide authentication data for determining if a requesting user requesting access to the firearm is an authorized user; a device condition sensor positioned on the body and configured to provide device condition data associated with at least one of the security holster and an environment in proximity to the security holster; and a computing device operably coupled to the locking mechanism, the access authentication assembly, and the device condition sensor, and configured to regulate the security holster between a locked configuration where access to the firearm is denied and an unlocked configuration where the firearm is accessible.

Additional aspects of the disclosure provide a computer-implemented method for regulating access to a firearm secured within a security holster, the method including: performing at least one of: detecting a request to access the firearm secured within the security holster by a requesting user, and detecting a distress signal predefined to be indicative of an emergency; in response to the at least one of detecting the request to access the firearm or detecting the predefined distress signal, activating a user monitoring device of an authorized user associated with the security holster and notifying a predefined support group associated with the authorized user; receiving an indication from the predefined support group, whether the emergency exists; and in response to receiving the indication that the emergency exists, receiving a notification that a support action is provided for the authorized user by the predefined support group.

The illustrative aspects of the present disclosure are designed to solve the problems herein described and/or problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the present disclosure, in which.

Figure 1:
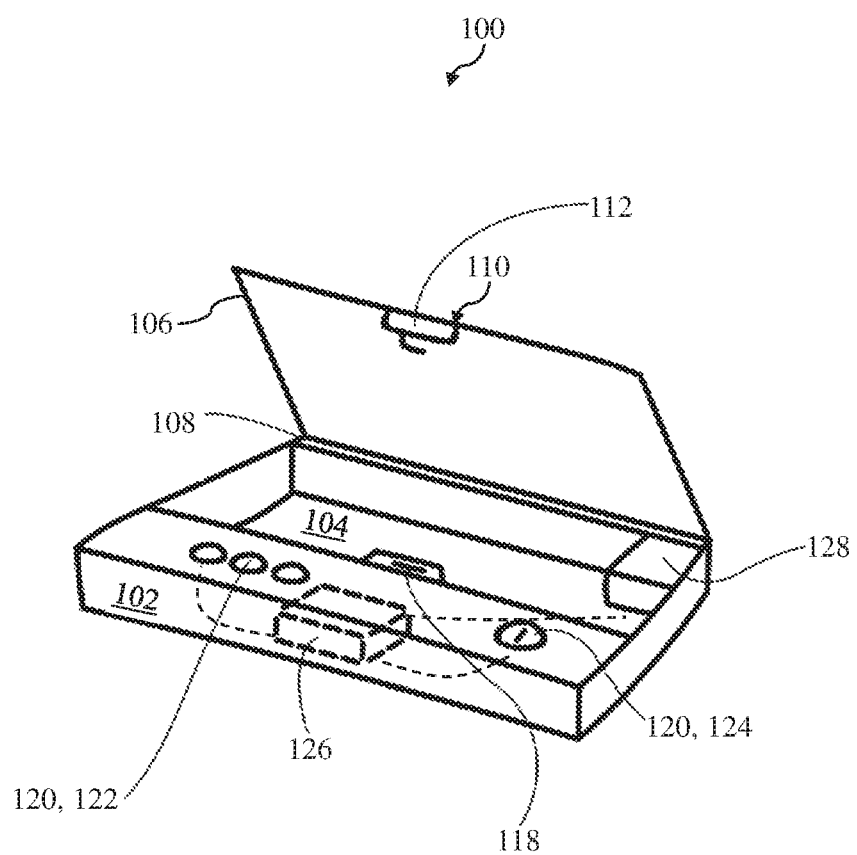
FIG. 1 shows a perspective view of a security device for securing items, according to embodiments of the present disclosure.

It is noted that the drawings of the disclosure are not necessarily drawn to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to security devices, and more particularly to security devices for items, control systems for security devices, and methods of regulating operations and/or access to items secured within the security devices. The security devices of the present disclosure provide enhanced safety features for regulating access to the items stored therein and are advantageous to use in situations where the conventional security devices fail to provide additional support to the users. For example, the security device of the present disclosure provides enhanced crisis management control. A new feature of the security device of the present disclosure is that it may temporarily restrict user access and/or immediately communicate with an individual or service to provide support in a crisis including, but not limited to, suicide attempts. As thoughts of committing suicide are urges that may pass between 5 minutes to an hour, implementing these user-set features beforehand in times of emotional and mental strength may effectively save the life of a person struggling with depression or suicidal tendencies. Embodiments of the present disclosure also provide enhanced home security. The security device may include a control system that, through features that monitor inputs, relay information to, and/or receive feedback from people, devices, services, and systems in an environment. In addition, security devices of the present disclosure are advantageous when being used as a security holster for law enforcement personnel. For example, the device provides security support in an unauthorized access attempt by a criminal who tries to grab an officer's holstered firearm. The device may further gather communication and data to provide real-time support to the officer in the field.

These and other examples are discussed below with reference to FIGS. 1-12. However, those skilled in the art will readily appreciate that the detailed description given herein with respect to these Figures is for explanatory purposes only and should not be construed as limiting.

FIG. 1 shows a perspective view of a security device 100 as a non-limiting example. Security device 100 may include a body or enclosure (used interchangeably hereafter) 102 including a plurality of distinct portions and/or components that may be configured to secure an item therein. As discussed herein, security device 100 may regulate operation and/or prevent access to the item secured within the enclosure 102. In non-limiting examples discussed herein, the item may include a firearm including, but not limited to, handguns, rifles, shotguns, or any other suitable ranged weapons. However, in other non-limiting examples, the items secured within security device 100 may include controlled substances (e.g., pharmaceuticals), other weapons (e.g., knives), jewelry/other valuables (e.g., money, coins), and/or documents (e.g., passports, house deeds). Furthermore, although shown as being sized to receive a small firearm (e.g., a handgun), it is understood that enclosure 102 of security device 100 may be sized to receive and/or secure larger items or firearms (e.g., rifles, shotguns), and/or a plurality of items or firearms. For example, enclosure 102 of security device 100 may be formed as a large firearm cabinet or safe.

As shown in FIG. 1, enclosure 102 of security device 100 may include a chamber or cavity 104 (hereafter, "cavity") for receiving or storing an item (e.g., firearm). A cover 106 (e.g., a door or a lid) may be operably coupled to enclosure 102 and configured to block access to cavity 104 where the item is stored. A connector 108 (e.g., a hinge) may couple cover 106 to enclosure 102 to allow cover 106 to swing, rotate, or move (e.g., in a sliding motion) between an open position as shown in FIG. 1, and a closed or locked position where cover 106 blocks access to the cavity 104 where the item is stored. In certain embodiments, connector 108 may rotatably couple cover 106 to enclosure 102. Although shown as a single cover, it is understood that enclosure 102 of security device 100 may include any suitable component for providing access to cavity 104 including, but not limited to, a lid, a door, multiple lids or doors, a slidable/track door, or the like.

Enclosure 102 may also include a locking mechanism 110 coupled to cover 106 and enclosure 102, and configured to secure cover 106 to enclosure 102. Locking mechanism 110 may be formed between cover 106 and the remaining portion of enclosure 102. In the non-limiting example shown in FIG. 1, locking mechanism 110 may include a latch 112 formed on cover 106, and a catch 118 positioned on enclosure 102, adjacent cavity 104. Latch 112 may mechanically mates with catch 118 to lock and/or secure cover 106 from cavity 104. Although shown as a latch and catch, locking mechanism 110 may be formed as any suitable mechanism, component, and system configured to selectively lock or secure enclosure 102 and more specifically, selectively secure cover 106 to enclosure 102 to prevent access to cavity 104, as discussed herein.

As shown in FIG. 1, security device 100 may also include at least one access authentication assembly 120 formed therein. Access authentication assembly 120 may be included within and exposed on enclosure 102 and configured to receive or provide authentication data for determining if a requesting user requesting access to the item is an authorized user. In a non-limiting example, access authentication assembly 120 is configured to receive or provide authentication data from the requesting user and/or the authorized user for determining if the authentication data from the requesting user and the authorized user match. Access authentication assembly 120 may allow a user to gain access or provide input or authentication data to request access at security device 100 to cavity 104 of enclosure 102, and/or unlock or open cover 106 of enclosure 102, as discussed herein. In the non-limiting example shown in FIG. 1, security device 100 may include a keypad 122 and a mechanical key assembly 124 formed and/or included in enclosure 102. Keypad 122 may include, for example, a plurality of input or interactive keys that allow a user to provide a predetermined code or sequence of key inputs to unlock or request to unlock cover 106/locking mechanism 110 to gain access to cavity 104, as discussed herein. Mechanical key assembly 124 may include any suitable lock-and-key assembly that may allow a user to insert and engage a key with a cylinder lock to release or request to release locking mechanism 110, as discussed herein. Although shown as a keypad 122 and mechanical key assembly 124, it is understood that access authentication assembly 120 may be formed from any suitable electromechanical or mechanical component, device, and/or system that may allow a user to release latch 112 from catch 118, and/or provide an input to request access to cavity 104, as discussed herein. That is, access authentication assembly 120 may include, but is not limited to, a mechanical key, a keypad, a fingerprint scanner, a radio frequency identification (RFID) reader, a device-to-device reader (e.g., a smartphone or a wearable device), a biometric marker or reader such as a face/voice recognition device/system or a heartrate monitor, or any combination thereof. These non-limiting examples may rely on a computing device and its various components for recognizing a user's request to access or open enclosure 102 of security device 100.

Additionally, while two access authentication assemblies 120 are shown as an example, security device 100 may include more or fewer access authentication assemblies 120. Furthermore, in one non-limiting example, one access authentication assembly 120 may include a "master" access authentication assembly 120 that may provide instant access to cavity 104 and/or may allow a user to unlock locking mechanism 110 without having to be granted access by performing the verification processes as discussed herein. For example, distinct from keypad 122, mechanical key assembly 124 may provide a user with immediate access to and/or may not require being granted access to cavity 104 as discussed herein once a master key is engaged with the cylinder lock.

Security device 100 may also include a computing device 126 and at least one device condition sensor(s) 128. Computing device 126 and/or device condition sensor(s) 128 may be positioned within or secured within enclosure 102, such that neither computing device 126 nor device condition sensor(s) 128 are accessible while cover 106 of enclosure 102 is closed and/or locked. As such, computing device 126 and device condition sensor(s) 128 may not be tampered or engaged with while enclosure 102 is closed and/or locked. In the non-limiting example, computing device 126 and device condition sensor(s) 128 are operably coupled and/or in electronic communication with one another for sharing and/or exchanging data. In another non-limiting example, device condition sensor(s) 128 may be included in and/or may be formed integral with computing device 126. Additionally, as shown in FIG. 1, computing device 126 may also be operably coupled and/or in electronic communication with access authentication assembly 120 of security device 100. As discussed herein, computing device 126 and device condition sensor(s) 128 may include components that may aid in the regulation of operations and/or access to the item (e.g., firearm 154) using security device 100. In certain embodiments, computing device 126 is operably coupled to locking mechanism 110, access authentication assembly 120, and device condition sensor 128, and configured to regulate security device 100 between a locked configuration where access to the item is denied and an unlocked configuration where the item is accessible.

Figure 2:
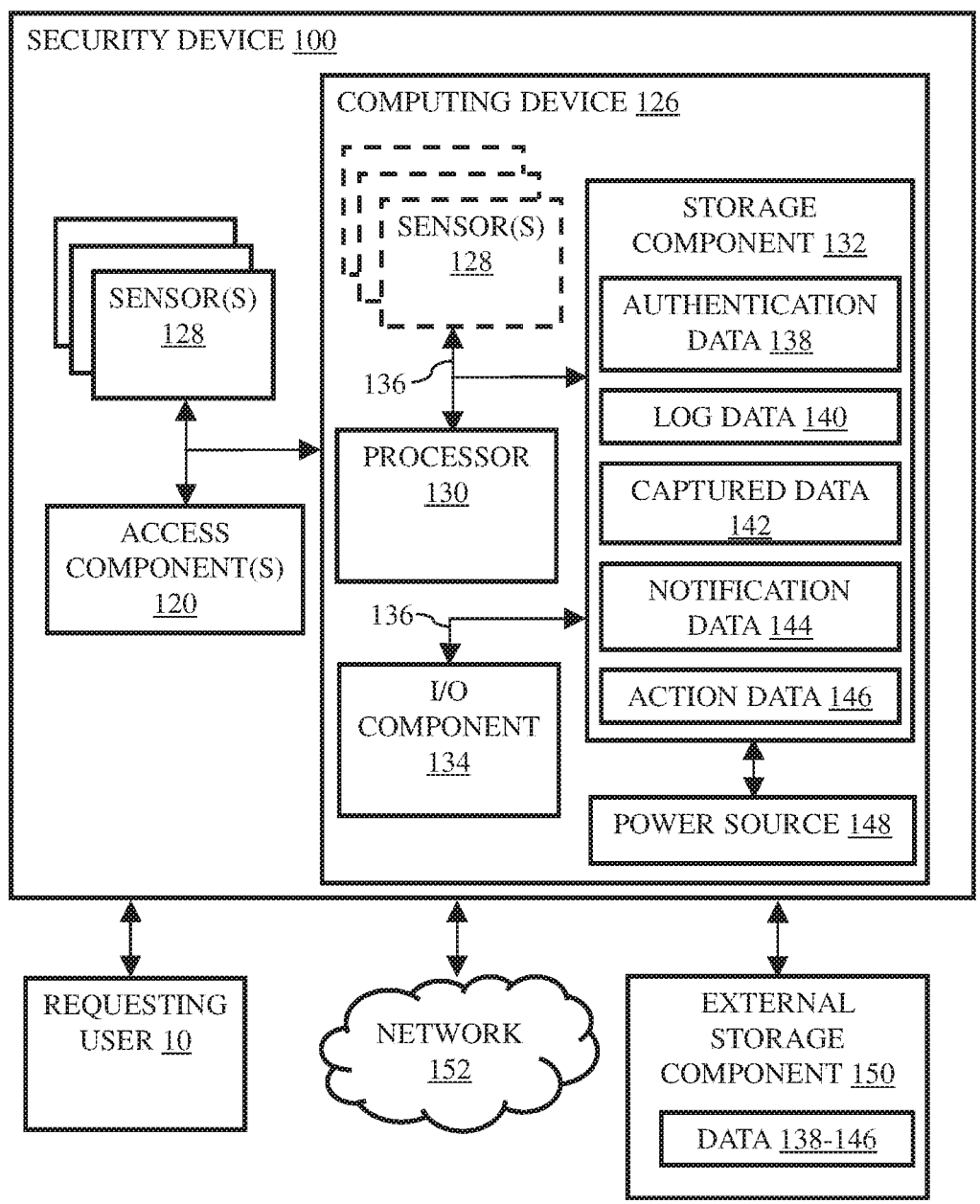
FIG. 2 shows a schematic view of the security device of FIG. 1, according to embodiments of the present disclosure.

Turning to FIG. 2, with continued reference to FIG. 1, a schematic view of security device 100 is shown. In the non-limiting example, and as discussed herein, security device 100 may include access authentication assembly 120, computing device 126 (including various components), and device condition sensor(s) 128 that may be configured to regulate operations and/or access to items (e.g., firearms) included within security device 100. It is to be understood that similarly numbered and/or named components may function in a substantially similar fashion. Redundant descriptions of these components have been omitted for brevity.

As discussed herein, access authentication assembly 120 may be formed from any suitable electromechanical or mechanical component, device, and/or system that may allow a user to open or request to open security device 100 and provide access to cavity 104 (see, FIG. 1), as discussed herein. For example, access authentication assembly 120 may include, but is not limited to, fingerprint scanners, radio frequency identification (RFID) readers, device-to-device readers (e.g., smartphone or wearable device), and/or biometric markers or reader such as face/voice recognition devices/system or heartrate monitors.

Computing device 126 of security device 100 may include, for example, at least one processor 130, storage component 132, input/output (I/O) component(s) 134, and various communication pathways 136 formed between various components of computing device 126. In general, processor(s) 130 execute program code, which is at least partially fixed in storage component 132. While executing program code, processor(s) 130 can process data, which can result in reading and/or writing transformed data from/to storage component 132 and/or I/O component(s) 134 for further processing. The pathway 136 provides a communications link between each of the components in computing device 126. Computing device 126 may also be implemented in a distributed manner such that different components reside in different physical locations.

Storage component 132 may also include modules, data and/or electronic information relating to various other aspects of security device 100. Specifically, operational modules, information, and/or data relating to authentication data 138, log data 140, device condition data 142, notification data 144, and action data 146. The operational modules and/or data may include the required information and/or may allow security device 100, and specifically computing device 126, to perform the processes discussed herein for regulating operations and/or access to items (e.g., firearms) included within security device 100.

Authentication data 138 may relate to information and/or data specific to authenticating and/or verify users requesting access to security device 100. For example, authentication data 138 may include predetermined passcodes (e.g., keys, RFID codes) associated with access and/or users, user specific information (e.g., names, biomarkers such as finger prints or retinal scans, access level), verifying user/third party information who may grant access to a requesting user 10, and/or any other access credential information which may allow requesting user 10 access to security device 100 and/or begin the process for allowing access to security device 100 by requesting user 10. Log data 140 may include information specific to the request for access and the actual accessing of the item included in security device 100. For example, log data 140 may include data relating to the time/date in which a user accesses or request to access the item in security device 100, how long security device 100 remains open/the item is removed, user specific information (e.g., name, access level) for user accesses or request to access the item in security device 100, number of attempted tries to access the item in security device, and so on. Device condition data 142 may relate to any data captured and/or obtained by device condition sensor(s) 128, I/O component 134, and/or external devices/system (e.g., third party security systems) in communication with security device 100. For example, device condition data 142 may include data relating to environmental conditions (e.g., recorded ambient noises such as alarms or gunshots) surrounding security device 100, physical conditions of security device (e.g., temperature, applied forces/movement, location), and the like. Notification data 144 may relate to any data or information pertaining to notifications that may be sent to a user (requesting and/or verifying) and/or third party services based on the accessing, request to access, log data 140, and/or device condition data 142. For example, notification data 144 may include data specific to the parties that may receive and/or the types of notifications sent to user/third party services based on the obtained access or the request access, along with the authentication data 138, log data 140, and/or device condition data 142. Action data 146 may relate to data and/or information specific to what actions may be taken by security device 100 and/or external systems in communication with security device 100 based on the access and/or request for access to the item secured by security device 100. In non-limiting examples, action data 146 may include data relating keeping security device 100 locked after denying access to security device 100, engaging an auditory/visual alarm (e.g., I/O component 134) included in security device 100, engaging Internet-of-Thing (IoT) devices or systems (e.g., lights, security camera system, third party security alarms, and so on), and the like.

I/O component 134 can include one or more human I/O devices, which enables user(s) 142 to interact with computing device 126, and/or for computing device 126 to obtain input and/or information (e.g., device condition data 144). That is, I/O device may include any suitable device that allows user(s) to provide information to computing device 126, for computing device 126 to obtain information relating to the user and/or environmental conditions surround security device 100, and/or for computing device to output information and/or signals to a user of security device 100. In a non-limiting example, I/O device 134 of computing system may include a microphone or any other suitable sound-receiving device. In this non-limiting example, the microphone may receive sound provided by a user (e.g., voice input from requesting user 10), and/or ambient sound for security device 100 (e.g., gunshot, alarm), and may subsequently provide the sound to computing device 126 to determine if access should be granted to requesting user 10, determine if notifications should be sent to designated parties, and/or if actions should be taken, as discussed herein. In another non-limiting example, I/O component 134 may be formed as a speaker or audio output device, either in conjunction with or separate from the microphone discussed above. As discussed herein, the speaker forming I/O component 134 may provide an auditory signal or output (e.g., alarm) when computing system 126 performs processes for determining whether to grant access to the item secured or locked within security device 100. I/O component 134 may also be formed as any suitable communication device, component, system, and/or antenna that may be configured to transmit data (e.g., notification data 144) to various users, control devices, and/or IoT devices. For example, I/O component 134 may be formed as a Wi-Fi system and antenna, a Bluetooth system and antenna, and/or any other system configured to communicate or transmit/receive data. In the non-limiting example, and as discussed herein, I/O component 134 may be configured to transmit notifications based on notification data 144 to users and/or third party services, and/or may be configured to engage IoT devices, after processing the user accessing security device 100 or requesting access to security device 100.

Power source 148, as shown in FIG. 2, may be included in computing device 126 for powering each device and/or component of computing device 126. That is, power source 148 may be configured to provide power to computing device 126 and the various components included therein that may be configured to regulate operations and/or access to items (e.g., firearms) included within security device 100. Additionally, in a non-limiting example, power source 148 may be configured to provide power to access authentication assembly 120 and/or device condition sensor(s) 128. Although shown as being a part of computing device 126, power source 148 may be distinct from computing device 126, but may still be configured to provide power to each of the respective components and/or devices of security device 100. Power source 148 may be any suitable source or system configured to provide power to security device 100 including, but not limited to, a rechargeable battery, a replaceable battery system, and/or a locally or remotely positioned alternating current power system.

Device condition sensor(s) 128 of security device 100 may include any suitable device condition sensor or component that may be configured to obtain data and/or generate data based on various inputs and/or information relating to security device 100. For example, device condition sensor(s) 128 may include a global positioning system (GPS) or device condition sensor configured to generate locational or positional data for security device 100, a force device condition sensor or an accelerometer configured to detect an applied force or movement of security device 100, and/or a sound/frequency detection sensor configured to detect specific sounds (e.g., alarms) and/or frequencies (e.g., silent alarm, gunshot), a microphone, a camera, a speaker, or any combination thereof.

Device condition sensor(s) 128 may obtain and/or generate the data and/or information, and subsequently provide the data to computing device 126 (e.g., device condition data 142) to processing as discussed herein. In the non-limiting example, and as discussed herein, device condition sensor(s) 128 of security device 100 may be distinct from computing device 126, but may be operably coupled to the same. In another non-limiting example, device condition sensor(s) 128 may be included within and/or formed integral with computing device 126. In some embodiments, device condition sensor 128 is configured to provide device condition data associated with at least one of security device 100 and an environment in proximity to the security device 100.

Security device 100, and specifically computing device 126 of security device 100, may also be in communication with an external storage component 150. External storage component 150 may be configured to store various modules, data and/or electronic information relating to various other aspects of computing device 126, similar to storage component 132 of computing device 126. Additionally, external storage component 150 may be configured to exchange (e.g., send and receive) data and/or electronic information with computing device 126. In the non-limiting example shown in FIG. 2, external storage component 150 may include any or all of the operational modules and/or data shown to be stored on storage component 132 (e.g., data 138-146). In a non-limiting example, external storage component 150 may be a cloud-based storage component or system.

Security device 100 may also be in communication with a network 152 for transmitting and/or receiving data when regulating operations and/or determining whether to allow access to items (e.g., firearms) included within security device 100. In the non-limiting example shown in FIG. 2, computing device 126, and more specifically, device condition sensor(s) 128 and/or I/O component 134 may be configured to communicate with other users, devices, and/or systems over network 152. Network 152 may be formed as any suitable network configured to transmit data between security device 100 and various other devices, users, and/or systems including, but not limited to internet protocol networks and/or telecommunication networks. In certain embodiments, at least one of computing device 126, device condition sensor(s) 128, or access authentication assembly 120 is configured to communicate, via network 152, to a pre-determined support group. Such a group may include at least one of a primary user, a designated user, a third party service, a third party system, an emergency response unit, an internet-of-things (IoT) device, or any combination thereof.

Figure 3:
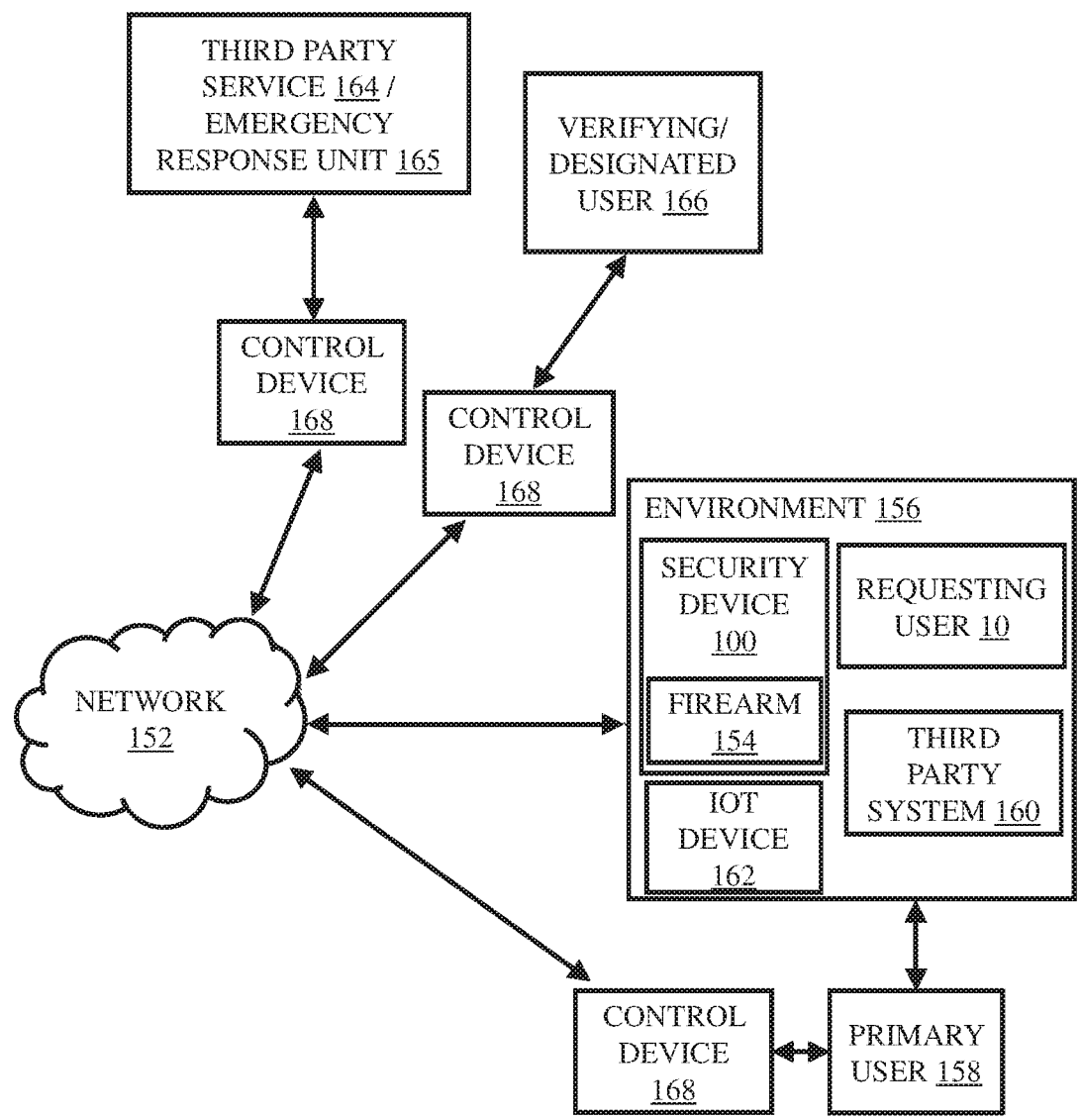
FIG. 3 shows a schematic view of various components and users of the security device of FIG. 1 communicating over a network, according to embodiments of the present disclosure.

Turning to FIG. 3, with continued to reference to FIGS. 1 and 2, a non-limiting example of network 152 is shown, which includes the various devices, systems, and/or users that may be involved in regulating operations and/or determining whether to allow access to items (e.g., firearms) included within security device 100. As shown in FIG. 3, and as discussed herein, security device 100 may include an item such as a firearm 154 positioned and secured therein. Security device 100 may be positioned within an environment 156. Environment 156 may include a predetermined or unknown area or space, for example a house or a bedroom, an office or commercial building, a group of buildings/structures, a geographical area bounded by particular coordinates, and/or any other area where it may be desired to secure or lock firearm 154 within security device 100. In the non-limiting example where environment 156 is known and/or predetermined, movement of security device 100 and/or the request for access may result in the securing or locking of security device 100 regardless of requesting user 10 being "authenticated," as discussed herein. Alternatively, in the same non-limiting example, security device 100 may only be opened by a primary user 158 of security device 100. Primary user 158 may have unrestricted, or at most partially restricted, access to firearm 154 secured within security device 100.

As shown in FIG. 3, environment 156 may also include a third party system 160 and/or IoT device 162. As similarly discussed herein with respect to FIG. 2, third party system 160 and IoT device 162 may be operably connected to and/or configured to communicate with security device 100 to notify and/or engage or operate when security device 100 regulates operations and/or determines whether to allow access to firearm 154 included within security device 100. In a non-limiting example, third party system 160 may include a security system that includes cameras, central notification units or devices, and/or alarm components. In the non-limiting example, security system forming third party system 160 may be in communication, via network 152, with a third party service 164 (e.g., personal security company) and/or emergency response unit 165 (e.g., police department, fire department, emergency dispatch). IoT device 162 may formed as, for example, a light or lighting system, a stereo or sound system, an alarm, or any other device or system that may operate and/or be controlled using internet-centric or Bluetooth communication. In the non-limiting example, and as discussed herein, security device 100 may engage and/or control the operation of IoT device 162 in predetermined circumstances when regulating operations and/or determining whether to allow access to items (e.g., firearms) included within security device 100.

As shown in FIG. 3, each of primary user 158, third party service 164, and/or a verifying user 166 may communicate with security device 100, via network 152, using a control device 168 operably coupled to and in electronic communication with security device 100. As discussed herein, primary user 158, third party service 164, and/or a verifying user 166 may utilize control device 168 to grant or deny requesting user 10 access to security device 100 and/or unlock security device 100 for requesting user 10. In a non-limiting example control device 168 may include a smart telephone. In other non-limiting examples, control device 168 can be implemented as any suitable device including, but not limited, a laptop or desktop computer, a tablet computing device, a gaming device, a display, a digital music player, a wearable computing device or display such as a watch, and other suitable type of electronic device that include a touch display and icons associated with interactive applications, commonly known as "Apps". Control device 168 may also include an App, software, and/or any other suitable software and/or hardware product that may regulate operations and/or determine whether to allow access to items (e.g., firearms) included within security device 100 via network 152. In non-limiting examples, control device 168 includes software that may be configured to receive notifications when requesting user 10 is requesting/gains access to security device, provide the user of control device 168 the ability to grant or deny access to security device 100, send notifications to third party service 164 (and/or other users), control third party system 160 or IoT device 162 in response to requesting user 10 requesting access to security device 100, and/or change preferences or settings relating to access/notification/controls for security device 100, as discussed herein.

FIGS. 4-7 show various flow diagrams illustrating non-limiting examples of processes for providing access and/or denying access to item(s) stored within security device 100 during operation(s). It is to be understood that similarly numbered components in the processes may function in the same or substantially similar fashion. These processes may be performed, e.g., by at least one computing device included within security device 100, control devices 168, and/or network 152 (see, FIGS. 1-3), as described herein. In other cases, these processes may be performed according to a computer-implemented method of regulating operations and/or allow/grant access to items using security device 100 during operation. In still other embodiments, these processes may be performed by executing computer program code on the computing device(s) included in security device 100, control devices 168, and/or network 152, causing the computing device(s) to regulate operations and/or allow/deny access to items using security device 100 during operation. While firearm access is illustrated as a non-limiting example in the description, the embodiments of the present application are not limited to accessing firearms, rather, the processes may be applied to other items stored within the security devices of the present disclosure.

Figure 4:
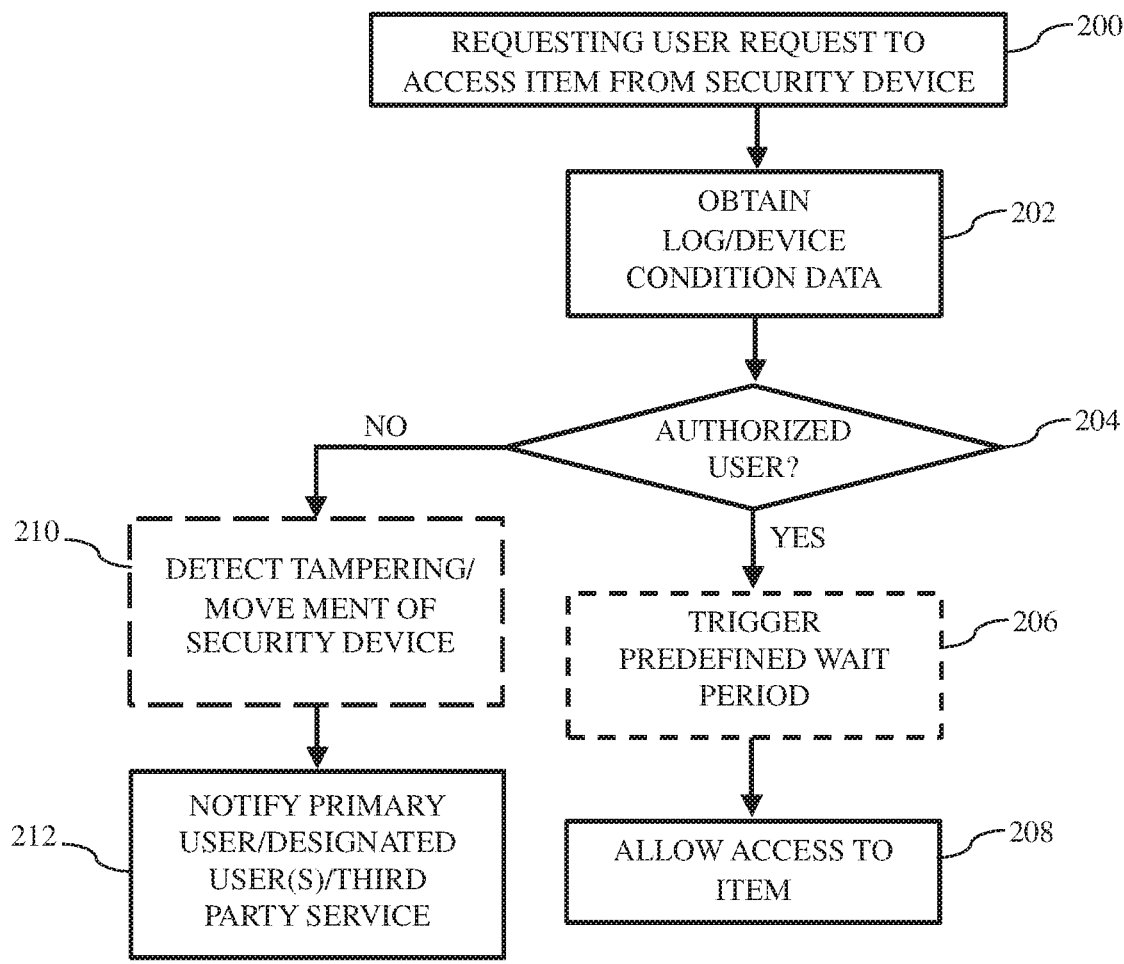
FIG. 4 shows an illustrative flow diagram of an example process for providing access or denying access to a security device, according to embodiments of the present disclosure.

Turning to FIG. 4, in step 200, a requesting user (e.g., requesting user 10 in FIG. 2) may request access to an item, for example a firearm, secured and/or locked within a security device. More specifically, a user who is within proximity of a security device containing or securing a firearm may request access to the firearm by interacting with the security device. The requesting user may request access to the firearm by interacting with one or more access authentication assemblies (e.g., access authentication assembly 120 in FIG. 1) included within the security device. The access authentication assembly may include, but is not limited to, a keypad, a combination lock, a RFID scanner, a biometric reader, a finger print/retinal scanner, a lock and key, and/or any other suitable components configured to receive the requesting user's input for accessing the firearm within the security device. The requesting user may request access by interacting with and/or providing input to the access authentication assembly of the security device. The input may be provided to the computing device including with the security device for further processing and/or verification.

In step 202, log data and/or device condition data may be obtained. More specifically, the security device securing the firearm within may gather, obtain, and/or capture log data and device condition data. In certain embodiments, the computing device of the security device may include a processor configured to capture log data including one or more timestamped actions of locking, unlocking, accessing, or tampering with the security device, or any combination thereof. As discussed herein, log data may include, but is not limited to, data relating to the time/date in which a user accesses or requests to access the firearm in the security device, how long the security device remains open/the firearm is removed from the security device, user specific information (e.g., name, access level) for user accesses or request to access the firearm in the security device, number of attempted tries (e.g., inputs using the access authentication assembly) to access the firearm in the security device, and so on. Additionally, and as discussed herein, the device condition data may be related with, but is not limited to, any data captured and/or obtained by components or devices of the security device (e.g., device condition sensor(s), I/O components) and/or external devices/system (e.g., third party security systems) in communication with the security device. For example, the obtained device condition data may include data relating to environmental conditions (e.g., recorded ambient noises such as alarms or gunshots) surrounding the security device, physical conditions of security device (e.g., temperature, applied forces/movement, location), and the like.

Although being shown as performed subsequent to step 200, obtaining step 202 may be performed before 200. That is, in a non-limiting example, obtaining the log/device condition data in step 202 may be performed continuously, regardless of whether the requesting user is requesting access to the firearm in step 200. Alternatively, obtaining the log/device condition data in 202 may be performed when triggering events occur and/or are detected in the environment containing the security device. For example, when the security device (and/or components included therein) detect a gunshot or receive information from the third party security system that an alarm has been triggered, the obtaining step 202 may be performed regardless of whether the requesting user is requesting access to the firearm in step 200. In another non-limiting example, obtaining the log/device condition data in 202 may be performed simultaneous to performing step 200. That is, obtaining the log/device condition data in 202 may be performed as soon as the requesting user begins to interacts with the security device (e.g., first input using access authentication assembly).

In step 204, it may be determined if the requesting user requesting access in step 200 is an authorized user. Specifically, the computing device of the security device may receive the requesting user input from the access authentication assembly, and may determine if the requesting user is an authorized user and/or a user who will/potentially can gain access to the firearm included in the security device, based on the authentication data collected from or provided by the requesting user and authentication data corresponding to the authorized user. The computing device may compare the authentication data collected from the requesting user with the authentication data corresponding to the authorized user to determine if the requesting user is an authorized user, and therefore allowed access to the firearm. Continuing the non-limiting example above, where the access authentication assembly includes a keypad, the computing device of the security device may compare the requesting user's code-input with predetermined authentication codes corresponding to the authorized user to determine if the requesting user is the authorized user. In certain embodiments, in response to determining the requesting user is the authorized user, the computing device may be configured to perform the one or more actions. Such actions may include: triggering a predefined wait period during which the access to the item is denied; allowing the requesting user access to the item and notifying at least one of a primary user, a designated user, or a third party service that the item is accessible to the requesting user; or notifying the at least one of the primary user, the designated user, or the third party service that the requesting user is requesting access to the item, and receiving an approval or a denial of access to the item to the requesting user from at least one of the primary user, the designated user, or the third party service. Such actions will be further discussed with respect to FIGS. 4-7. In a non-limiting example illustrated in FIG. 4, in response to determining the requesting user is the authorized user, that is, in which the authentication data/input of the requesting user matches the authentication data of the authorized user ("YES" at step 204), the processes may proceed to step 206/208. Conversely, if it is determined that the authentication data collected from the requesting user does not match authentication data corresponding to the authorized user ("NO" at step 204), the processes may proceed to step 210/212.

The authentication data collected from or provided by the requesting user may be a single generic input that allows all authorized users to access the firearm stored or included within the security device. In this non-limiting example, all authorized users may have the same access/security level and/or accessibility to the firearm included within the security device. In certain embodiments, inputting the generic input by any authorized user may trigger a predefined wait time period to begin (e.g., step 206), may allow instant access (e.g., step 208) or may provide a notification to another user or service to allow or deny the authorized users the access (see, FIG. 6). In another non-limiting example, each authorized user may have a specific input (e.g., user specific code-input) that may trigger the predefined wait time to begin, may grant the requesting user instant access, or may provide a notification to another user or service to allow or deny the authorized user the access. In this non-limiting example, each authorized user may have individual or distinct access/security levels and/or accessibility. Each distinct access/security level may result in distinct processes being performed, as discussed herein. For example, a first authorized, requesting user (e.g., a minor) may be required to proceed to step 206 prior to proceeding to step 208, while a second authorized, requesting user (e.g., a primary user or an adult) may proceed straight to step 208, without triggering step 206. In some embodiments, the first requesting user (e.g., the minor) may only be granted access to the firearm using their specific input before or after a second requesting user (e.g., the primary user or the adult) inputs their specific input.

In step 206 (shown in phantom as optional), a predefined wait period may be triggered. That is, once the requesting user is determined to be an authorized user (e.g., "YES" at step 204), a predefined wait period may be triggered or begin. The predefined wait period may be at least 5 minutes. In a non-limiting example, the predefined wait period may be generic, such that all authorized users must wait until the predefined wait period expires (e.g., 1 hour) before the process proceeds to step 208. In other non-limiting examples, the predefined wait period may be specific to and/or distinct for each individual authorized user. The specific predefined wait period may be dependent, at least in part, on the user's individual or customized access/security level, and/or accessibility. For example, a first authorized, requesting user may have a predefined wait period of 30 minutes prior to proceeding to step 208, while a second authorized, requesting user may have a predefined wait period of 3 hours prior to proceeding to step 208.

In step 208, the authorized requesting user may be allowed or granted access to the firearm stored or secured in the security device. That is, the security device may be unlocked and/or opened, and the authorized requesting user may be allowed access to the firearm within the security device. When allowed access to the firearm, the security device may be instantly unlocked and/or opened to indicate the authorized requesting user is granted access to the firearm. In addition to unlocking, the security device may provide an output or notice that indicate that the authorized requesting user is now granted or allowed access to the firearm. For example, a speaker included in the security device may play an "access tone" indicating that the security device is now unlocked, and the firearm is now accessible.

In a non-limiting example, the authorized, requesting user may be allowed or granted access to the firearm included in the security device at the expiration of the predefined wait period of step 206. In another non-limiting example, the authorized, requesting user may be allowed or granted access to the firearm included in the security device immediately after the security device, and more specifically the computing device included therein, determines that the requesting user is an authorized user (e.g., "YES" at step 204). As discussed herein, the process of skipping step 206 is based, at least in part, on the individual or distinct access/security level associated with the authorized, requesting user (e.g., primary user), which may be included in the authentication data stored in and/or accessible by the computing device of the security device.

In response to the security device, and more specifically the computing device included therein, determining the requesting user is not an authorized user (e.g., "NO" at step 204), the process may proceed to step 210. In step 210 (shown in phantom as optional), the security device, and the various components included therein may detect and/or determine if the unauthorized, requesting user is tampering with and/or undesirably moving the security device, based on a log data, an authentication data, a device condition data, or any combination thereof. In certain embodiments, the log data and the device condition data are obtained by the security device, or a device condition sensor, or both. In certain embodiments, the computing device may be configured to determine, based on the device condition data, if the security device is tampered with while the security device is in the locked configuration. The computing device of the security device may determine that the unauthorized, requesting user is tampering with the security device by attempting multiple incorrect inputs on the access authentication assembly of the security device. For example, where the unauthorized, requesting user provides a predetermined number of incorrect code-inputs (e.g., five incorrect inputs), the security device may determine that the unauthorized, requesting user is attempting to tamper with security device to gain undesired access to the firearm. In another non-limiting example, the device condition sensor(s) and/or I/O components of the security device may be utilized to determine if the unauthorized, requesting user is tampering and/or attempting to move the security device. For example, an accelerometer included within the security device may detect or determine if the security device has been undesirable struck (e.g., hammer hit) or dropped (e.g., tampered), and/or a GPS/telecommunication component may track the position of the security device within the environment (e.g., movement).

In step 212, a notification may be sent to a designated user or service. More specifically, in step 212 a notification that an unauthorized, requesting user has requested access to the firearm secured within the security device may be sent to one or more predetermined user(s) and/or third party service(s). The predetermined user(s) may include a primary user of the security device or a designated user distinct from the primary user and/or requesting user. In a non-limiting example, the notification may be sent to a control device (e.g., smart telephone, tablet, desktop/laptop computer, and the like) associated with the predetermined user(s) and/or third party service(s). The notification may be sent to a primary user of the security device, a designated user (distinct from the primary user/requesting user), and/or a third party service (e.g., emergency response unit) in response to detecting the unauthorized, requesting user tampering with the security device (e.g., step 210), or simply determining that the requesting user is not authorized for access (e.g., "NO" at step 204). The notification may be sent to each or any of the primary user of the security device, a designated user, and/or a third party service based on predefined preferences or settings for the security device. For example, the primary user may receive a notification when any unauthorized, requesting user attempts to access the firearm (regardless of detected tampering or now), however, the third party service may only receive a notification when tampering with the security device is detected.

Where the unauthorized, requesting user is known based on authentication data, the notification may also provide personal information relating to the unauthorized, requesting user as well. For example, a first requesting user (e.g., minor) may only be granted access to the firearm using their specific input before or after a primary user or a second requesting user (e.g., adult) inputs their specific input. If only the first requesting user's code is input, then the notification provided to the primary user, a designated user, and/or a third party service may include personal information (e.g., a name) associated with the first user and/or the specific unauthorized input provided to the security device.

In another non-limiting example, the notification provided to the primary user, and/or a designated user may include the option to also notify a third party service. That is, the notification initiated by the security device and provided to the respective or designated control device may also include the option or ability for the receiving user to provide or forward the notification to a third party service. In any of the non-limiting examples, the notification may include additional information obtained and/or generated by the security device and the components included therein and/or in which the security device is in communication with. For example, the notification may include information or data relating to when the requesting user attempted to gain access to the firearm (e.g., log data). In another non-limiting example where tampering is detected, the notification may include information relating to the tampering including that "tampering was detected" and/or an indication of damage based on information or data (e.g., device condition data) obtained by the accelerometer. In further non-limiting examples, the notification may indicate that the security device was moved based on the GPS of the security device. In other non-limiting examples, the notification may indicate that the third party security system for the environment containing the security device holding the firearm has been triggered or alarmed. This information or data (e.g., device condition data) may be based on the alarm sound detected by a sound device condition sensor/microphone included within the security device and/or the communication between the computing device of the security device and the third party security system of the environment. As discussed herein, the information or data provided in the notification may be based on the log/device condition data obtained in step 202.

Figure 5:
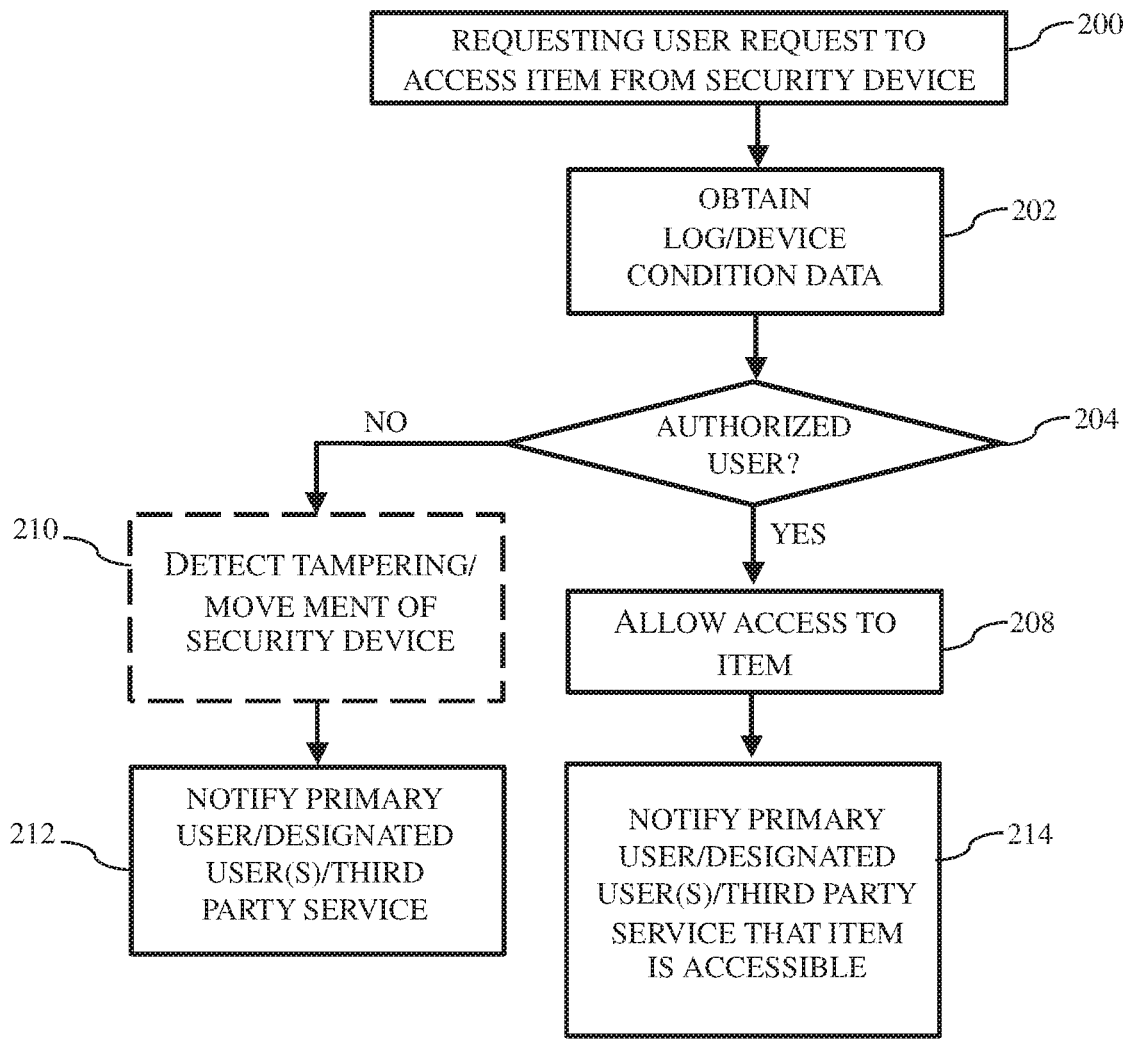
FIG. 5 shows an illustrative flow diagram of an example process for providing access or denying access to a security device, according to embodiments of the present disclosure.

Turning to FIG. 5, another non-limiting example process for allowing access to an item (e.g., a firearm) secured within a security device is shown. As discussed herein, the process shown in FIG. 5 may include providing the predetermined user(s) and/or third party services a notification regarding the accessibility to the firearm secured within the security device. It is understood that similarly numbered and/or named steps may operate in a substantially similar fashion. Redundant explanation of these steps has been omitted for brevity.

Distinct from the non-limiting example shown and discussed herein with respect to FIG. 4, an authorized, requesting user may not be required to wait a predefined wait period (e.g., step 206), prior to being allowed access to the firearm in step 208. That is, after determining that the requesting user is an authorized user in step 204, the security device may unlock and/or open, and the authorized, requesting user may be allowed access to the firearm included or secured within the security device.

In step 214, a notification may be sent to a designated user or service. More specifically, a notification that the firearm is accessible, the security device is unlocked, and/or an authorized, requesting user has gained or been allowed access to the firearm secured within the security device may be sent to the predetermined user(s) and/or third party service(s). Similar to step 212 as described with respect to FIG. 4, the notification in step 214 may be sent to a control device (e.g., smart telephone, tablet, desktop/laptop computer, and the like) associated with the primary user of the security device, a designated user, and/or a third party service (e.g., emergency response unit). The notification may be sent to each or any of the primary user of the security device, a designated user, and/or a third party service based on predefined preferences or settings for the security device, as similarly discussed with respect to step 212 of FIG. 4.

Also similar to step 212, the notification provided in step 214 may include information and/or data available to, and/or generated/obtained by the security device. For example, when the authorized, requesting user is known (e.g., based on authentication data), the notification may also provide personal information relating to the authorized, requesting user. In another non-limiting example, the notification in step 214 may include any of the information or data relating to the log data and/or device condition data that may be obtained in step 202. Furthermore, in an additional non-limiting example, the notification provided in step 214 may also provide the option or ability for the receiving user (e.g., primary user or designated user of step 212) to provide or forward the notification (and data included therein) to another user and/or a third party service.

Figure 6:
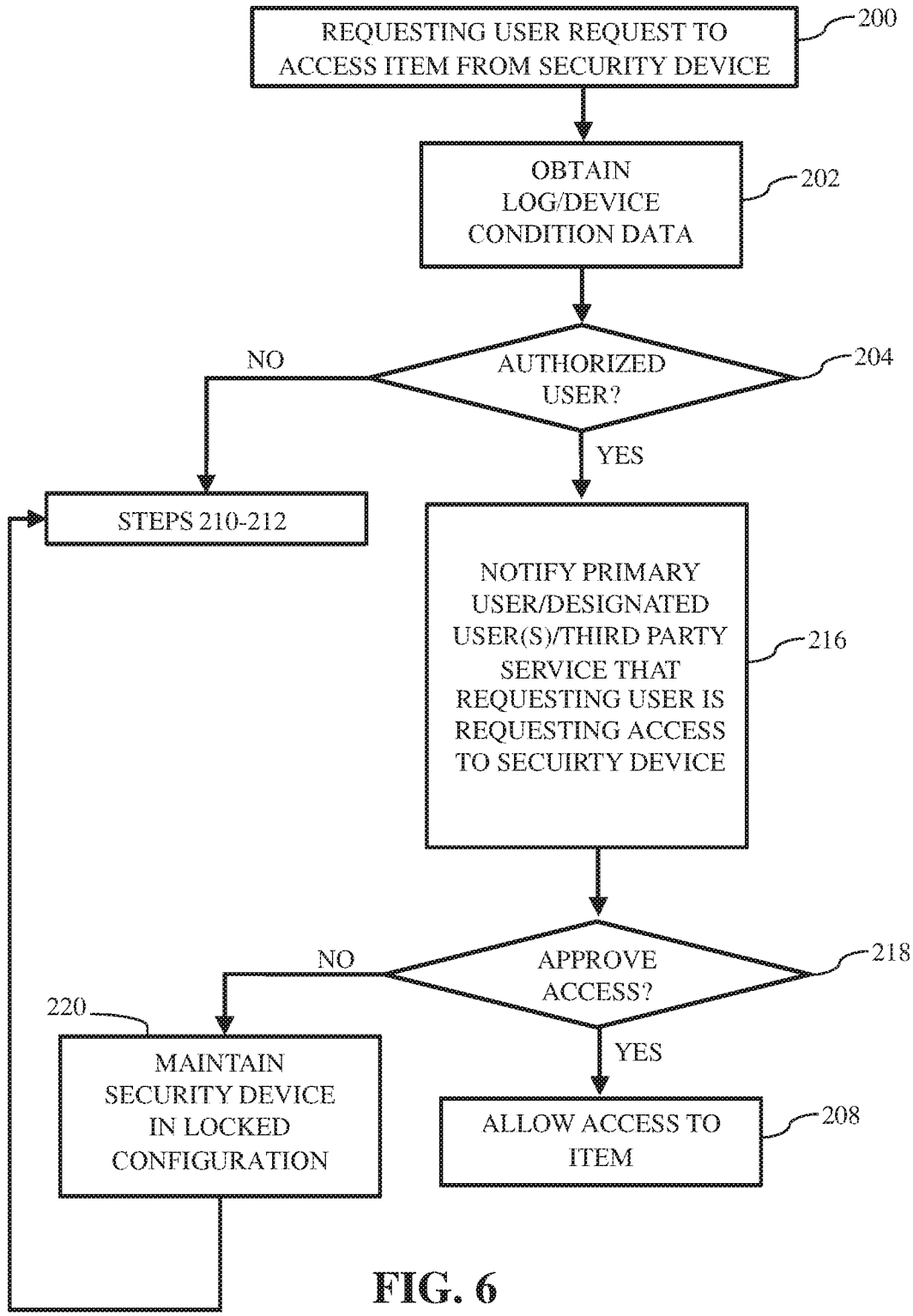
FIG. 6 shows an illustrative flow diagram of an example process for providing access or denying access to a security device, according to embodiments of the present disclosure.

Turning to FIG. 6, another non-limiting example process for allowing access to an item (e.g., a firearm) secured within a security device is shown. The process as shown in FIG. 6 may include asking the predetermined user(s) and/or third party services if the authorized, requesting user should be allowed access to the firearm secured within the security device. It is understood that similarly numbered and/or named steps may operate in a substantially similar fashion. Redundant explanation of these steps has been omitted for brevity.

Subsequent to performing steps 200-204, a notification may be sent to a designated user or third party service. More specifically, subsequent to affirming that the requesting user is an authorized user (e.g., "YES" at step 204), a notification that an authorized, requesting user has requested access to the firearm secured within the security device may be sent to the predetermined user(s) and/or third party service(s) in step 216. Similar to the other notification steps discussed herein (e.g., steps 212, 214), the notification sent or provided in step 216 may be sent to a control device (e.g., smart telephone, tablet, desktop/laptop computer, and the like) associated with the primary user of the security device, the designated user (distinct from the primary user/requesting user), and/or the third party service (e.g., emergency response unit). The notification may be sent to each or any of the primary user of the security device, the designated user, and/or a third party service based on predefined preferences or settings for the security device. Additionally, the notification provided in step 216 may include information and/or data available to, and/or generated/obtained by the security device (e.g., authentication data in step 200, log data and/or device condition data in step 202), and/or may provide the option or ability for the receiving user to provide or forward the notification (and data included therein) to another user and/or a third party service, as similarly discussed herein with respect to steps 212 and/or 214.

However, distinct from steps 212 and 214 discussed herein, the notification provided in step 216 may provide the receiving, the predetermined user(s) and/or third party service(s) the ability to either approve or allow access to the firearm secured within the security device, or deny access to the firearm. That is, the notification provided to the control device associated with the primary user of the security device, the designated user, and/or a third party service may prompt the user/third party service to make a decision to either approve or deny the requesting user access to the firearm. Based on the information or data included in the notification (e.g., authentication data, log data, device condition data), the primary user, the designated user, and/or a third party service may decide to approve or deny access to the firearm, as discussed herein.

In step 218, it may be determined if the predetermined user(s) and/or third party service will approve access the authorized, requesting user access to the firearm. Specifically, the primary user of the security device, the designated user, and/or a third party service that receives the notification in step 216 may provide input to either approve or deny the authorized, requesting user access to the firearm secured within the security device. The primary user, the designated user, and/or a third party service may provide the input, and more specifically the approval or denial of access, via the control device that received the notification and prompt to make a decision regarding accessibility. Where the predetermined user(s) and/or third part service approves access to the firearm ("YES" at step 218), the processes may proceed to step 208. That is, where the primary user, the designated user, and/or a third party service approves or grants the authorized, requesting user access, the security device may unlock and/or open, and the authorized, requesting user may be allowed access to the firearm included or secured within the security device.

Conversely, if the predetermined user(s) and/or third part service denies access to the firearm ("NO" at step 218), the processes may proceed to step 220. In step 220, the security device may remain and/or be maintained in the locked configuration. That is, once access is denied in step 218, the security device may stay locked and/or secured, and the authorized, requesting user may not be allowed access to the firearm included or secured within the security device. To inform the requesting user that they have been denied access to the firearm, the security device may provide an output or notice. For example, a speaker included in the security device may play a "denial tone" indicating that the predetermined party and/or third party service has denied the authorized, requesting user access to the firearm and security device remains in the locked configuration. As shown in FIG. 6, subsequent to performing step 220, steps 210 and/or 212 (as described in detail with respect to FIG. 4) may be performed as well.

Figure 7:
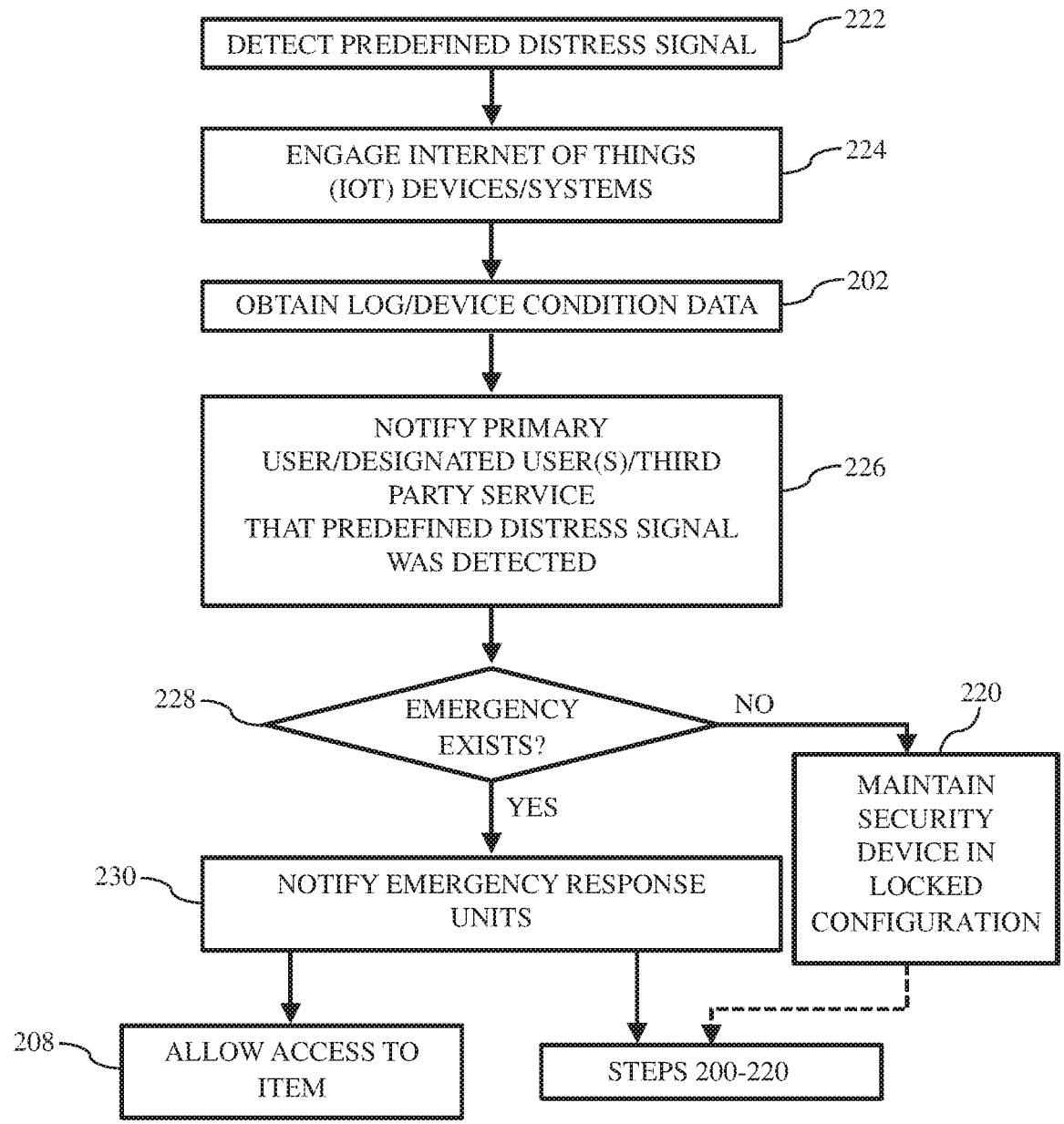
FIG. 7 shows an illustrative flow diagram of an example process for providing access or denying access to a security device, according to embodiments of the present disclosure.

Turning to FIG. 7, an additional non-limiting example process for allowing access to a firearm secured within a security device is shown. As discussed herein, the process shown in FIG. 7 may be triggered based on a detection of a predefined distress signal. It is understood that similarly numbered and/or named steps may operate in a substantially similar fashion. Redundant explanation of these steps has been omitted for brevity.

In step 222, a predefined distress signal(s) may be detected. More specifically, the security device securing the firearm may detect at least one predefined distress signal using the components and/or devices included therein. The predefined distress signal(s) may relate to any emergency-based data or signal(s) that may be detected and/or obtained by components or devices of the security device (e.g., device condition sensor(s), I/O components). The predefined distress signal(s) may be indicative of an emergency. For example, the predefined distress signal may include a gunshot sound detected by a microphone or a sound level meter included within the security device. Additionally, or alternatively, the predefined distress signal may include an audible alarm associated with a third party security or alarm system, as detected by a microphone of the security device. In other non-limiting examples, the predefined distress signal may be associated with actions and/or triggers from external components, devices, and/or systems that are taken in response to an emergency. For example, the predefined distress signal may be when a user dials or calls an emergency response unit (e.g., 9-1-1, police), when a third party security or alarm system dials or calls an emergency response unit, and/or when a third party security or alarm system is activated, triggered, and/or "tripped." In these examples, the security device may be connected to and/or in communication with the dialing telephone/communication device (e.g., a mobile phone) and/or the third party security or alarm system to detect the predefined distress signal. In any of the non-limiting examples, the security device may detect the predefined distress signal by continuously querying the components and/or constantly engaging the devices and/or components configured to detect the predefined distress signal.

In step 224, internet of things (IoT) devices and/or systems may be engaged or activated. More specifically, and in response to receiving the predetermined distress signal in step 222, IoT devices and/or systems may be engaged, operational, and/or activated. The IoT devices and/or systems may be engaged automatically by the security device. That is, in a non-limiting example, the IoT devices and/or systems may be automatically engaged by the security device in response to the security device detecting the predefined distress signal. As discussed herein, the IoT devices and/or systems may include various devices and/or systems in communication with the security device that may be engaged, operational, and/or activated by the security device. For example, the IoT devices and/or systems may include, but are not limited to, smart lights or light systems, security camera system, third party security alarms, audio systems, and the like. In another non-limiting example, the engaging of IoT devices and/or systems may be triggered based on the predetermined user(s) and/or third party service's input from the notification received in step 226. Whether the IoT is engaged by the security device or the predetermined user(s) and/or third party service may be based on preset preferences or options for the security device and established by the predetermined user(s) (e.g., primary user) and/or the third party service. Additionally, which IoT device and/or system is engaged and/or the operational parameters of the engaged IoT devices and/or systems may be based on preferences or options established by the predetermined user(s) (e.g., primary user) and/or the third party service. For example, where an audible alarm is detected by the security device, and/or the third party security or alarm system is detected by the security device as being "tripped," the security device may turn on all smart lights in the environment and engage a security camera system. Additionally, where the security device detects the sound of gunshots, the security device may engage the smart lights and the security camera system, and may engage or turn-on an audio system to a maximum volume.

In step 202, the security device securing the firearm within may gather, obtain, and/or capture log data and device condition data. As discussed herein, log data may include data relating to the time/date in which a user accesses or request to access the firearm in the security device, how long the security device remains open/the firearm is removed from the security device, user specific information (e.g., name, access level) for user accesses or request to access the firearm in the security device, number of attempted tries (e.g., inputs using the access authentication assembly) to access the firearm in the security device, and so on. In some instances where the predefined distress signal is detected, a requesting user may not yet have attempted to access or request access to the firearm. As such, no log data may be captured. Additionally, and as discussed herein, the device condition data may relate to any data captured and/or obtained by components or devices of the security device (e.g., device condition sensor(s), I/O components) and/or external devices/system (e.g., third party security systems) in communication with the security device. For example, the obtained device condition data may include data relating to environmental conditions (e.g., recorded ambient noises such as alarms or gunshots) surrounding the security device, physical conditions of security device (e.g., temperature, applied forces/movement, location), the detected, predefined distress signal, and the like.

In step 226 a notification may be sent to the predetermined user(s) and/or third party service(s). More specifically, subsequent to detecting the predefined distress signal in step 222, a notification that the predefined distress signal has been detected may be sent to the predetermined user(s) and/or third party service(s) in step 226. Similar to the other notification steps discussed herein (e.g., steps 212, 214, 216), the notification sent or provided in step 226 may be sent to a control device (e.g., smart telephone, tablet, desktop/laptop computer, and the like) associated with the primary user of the security device, the designated user (distinct from the primary user/requesting user), and/or the third party service (e.g., third party security company, emergency response unit). The notification may be sent to each or any of the primary user of the security device, the designated user, and/or a third party service based on predefined preferences or settings for the security device. Additionally, the notification provided in step 226 may include information and/or data available to, and/or generated/obtained by the security device (e.g., data or information relating to the detected distress signal, log data and/or device condition data in step 202), and/or may provide the option or ability for the receiving user to provide or forward the notification (and data included therein) to another user and/or a third party service, as similarly discussed herein with respect to steps 212 and/or 214.

Similar to step 216 discussed herein with respect to FIG. 6, the notification provided in step 226 may provide the receiving, the predetermined user(s) and/or third party service(s) the ability to provide input and/or make a decision relating to the distress signal. More specifically in step 226, the notification provides the predetermined user(s) and/or third party service(s) with the ability to decide if an emergency or emergency situation has or has not been detected. That is, the notification provided to the control device associated with the primary user of the security device, the designated user, and/or a third party service may prompt the user/third party service to make a decision to indicate that an emergency is detected or that no emergency is detected. Based on the information or data included in the notification (e.g., distress signal, log data, device condition data), the primary user, the designated user, and/or a third party service may decide to indicate that an emergency is detected or not, as discussed herein.

Furthermore, in a non-limiting example, in step 226 the predetermined user(s) and/or third party service(s) may be provided with an option to engage IoT devices and/or systems in communication with the security device. That is, in the notification provided in step 226, the predetermined user(s) and/or third party service(s) may have the ability to select certain IoT devices and/or systems and/or control the operation of such IoT devices and/or systems using the security device. For example, the notification may provide the primary user, the designated user, and/or the third party service(s) with the ability to engage, and/or active smart lights or light systems and/or a security camera system via the control device which receives the notification and the security device.

In step 228, it may be determined if there is an emergency and/or if an emergency exists. Specifically, the primary user of the security device, the designated user, and/or a third party service that receives the notification in step 226 may provide input or indicate whether emergency or emergency situation exists. The primary user, the designated user, and/or a third party service may provide the input/indication, and more specifically the existence of an emergency, via the control device that received the notification and prompt to make a decision regarding the emergency. Where the predetermined user(s) and/or third part service indicates that an emergency or emergency situation exists ("YES" at step 228), the processes may proceed to step 230. That is, where primary user, the designated user, and/or a third party service determines that an emergency or emergency situation exists based on the obtained data, the process may proceed to step 230.

In step 230, in response to receiving an indication from at least one of the primary user, the designated user or the third part service that an emergency or emergency situation exists, an emergency response unit may be notified. That is, where the predetermined user(s) and/or third part service indicates that an emergency or emergency situation exists ("YES" at step 228), the security device and/or the primary user, designated user and/or third party service may notify an emergency response unit (e.g., police department, fire department, emergency dispatch). In a non-limiting example, the security device may automatically notify the emergency response unit in step 230 and may provide all obtained and/or detected information or data (e.g., detected distress signal, log data, device condition data). In another non-limiting example, the notified primary user, designated user and/or third party service may notify the emergency response unit using the control device that receives the notification in step 226. In this non-limiting example, the notified primary user, designated user and/or third party service may also include any or all obtained and/or detected information or data from the security device in the notification to the emergency response unit in step 230. In either example, the emergency response unit may receive obtained or detected data from the security device including, for example, a recording or live feed being captured by the engaged or activated security camera system (e.g., IoT device or system).

Subsequent to the emergency response unit being notified in step 230, the security device may immediately allow access to the firearm secured within the security device. That is, in one non-limiting example, once the emergency response unit is notified of the emergency or emergency situation, the security device may unlock and/or open, and a user may be allowed access to the firearm included or secured within the security device. Alternatively, and as shown in FIG. 7, once the emergency response unit is notified of the emergency or emergency situation, the process may follow further process steps as discussed with respect to FIGS. 4-6, starting with requesting step 200. In this non-limiting example, after (or simultaneous to) the security device notifies the emergency response unit of the detected emergency, the security device may take the necessary steps to grant or allow access to firearm secured within the security device to an authorized, requesting user, as discussed in detail with respect to FIGS. 4-6.

Conversely, if the predetermined user(s) and/or third part service indicates that an emergency does not exist ("NO" at step 228), the processes may proceed to step 220. In step 220, the security device may remain or be maintained in the locked configuration to prevent access to the item (e.g., firearm 154) secured within the security device. That is, once access is denied in step 218, the security device may stay locked and/or secured, and the authorized, requesting user may not be allowed access to the firearm included or secured within the security device. As shown in FIG. 7, subsequent to performing step 220, the process may follow further process steps, for examples, steps selected from steps 200-220 as discussed with respect to FIGS. 4-6. That is, the security device may take the necessary steps to grant or allow access to firearm secured within the security device to a requesting user, as discussed in detail with respect to FIGS. 4-6. For example, subsequent to notifying the emergency response unit, the security device may detect a request to access the item from the security device by a requesting user (step 200), and determine if the requesting user is an authorized user based on authentication data corresponding the authorized user (step 204). In response to determining the requesting user is the authorized user, the security device may allow access to the item secured within the security device (step 208), and in response to determining the requesting user is not the authorized user, the security device be maintained in the locked configuration to prevent access to the item (step 220).

Figure 8A:
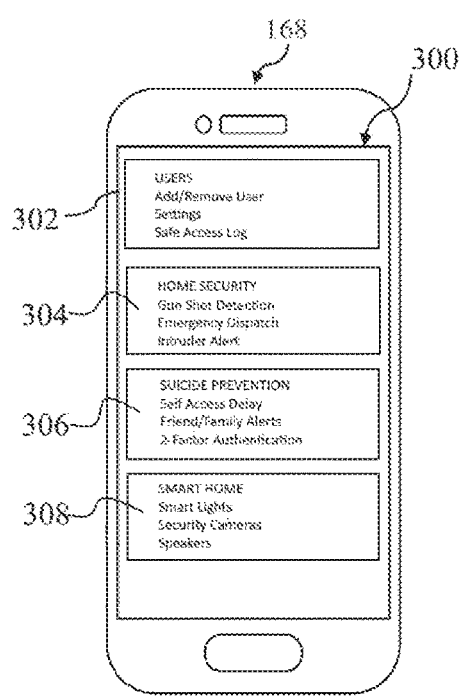
FIG. 8A shows a front view of an example control device of the network shown in FIG. 3 including various display screens, according to embodiments of the present disclosure.
Figure 8B:
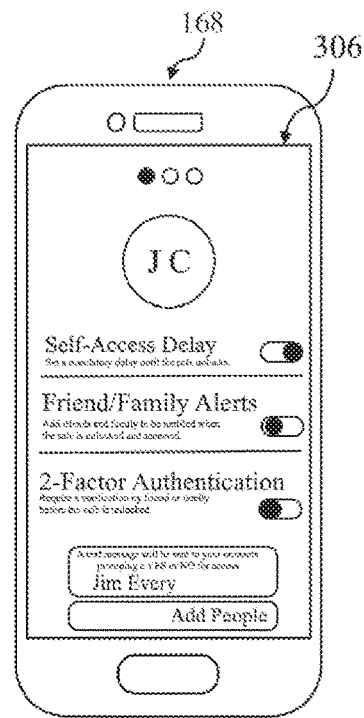
FIG. 8B shows another front view of an example control device of the network shown in FIG. 3 including various display screens, according to embodiments of the present disclosure.
Figure 8C:
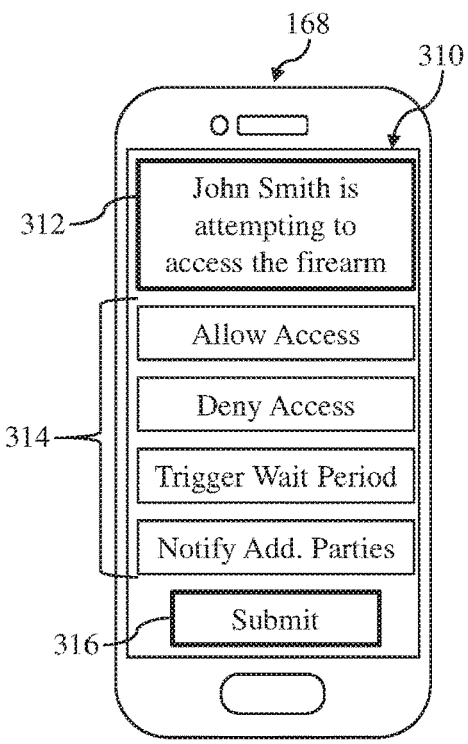
FIG. 8C shows yet another front view of an example control device of the network shown in FIG. 3 including various display screens, according to embodiments of the present disclosure.

Turning to FIGS. 8A-8C, non-limiting examples of control device 168 are shown. More specifically, FIGS. 8A and 8B show non-limiting examples of control device 168 configured to control various settings, preferences, and/or options related to the operation of security device 100. Additionally, FIG. 8C shows a notification provided on control device 168, as similarly discussed herein with respect to FIGS. 4-7. It is understood that similarly numbered and/or named components may function in a substantially similar fashion. Details of these components are similarly described with respect to FIGS. 4-7 and have been omitted herein for brevity.

In FIG. 8A, a preference, options, and/or settings screen 300 is shown on control device 168. Settings screen 300 may provide the user of control device 168 the ability to control and/or adjust preferences, options, or settings that relate to various operations and/or functions of the security device 100. For example, user portion 302 may provide the ability to, for example, add new users, edit existing users and/or view previous log data. In the non-limiting example, user portion 302 may allow the user (e.g., primary user) of control device 168 to add/edit a user's name/information/access level/passcode. The information included in users portion 302 may correspond to authentication data 138 and/or log data 140 discussed herein with respect to FIG. 2.

Home security portion 304 may provide the ability to edit or adjust how a third party security system in communication with security device 100 may react in response to the detection of certain events. For example, home security portion 304 may allow the user of control device 168 to indicate what steps or actions the third party security system 160 should take in response to detecting a gunshot or a triggering of the alarm, and what third party service 164/emergency response unit 165 should be contacted or notified when specific circumstances are met. For example, home security portion 304 may provide the user of control device 168 the option to have security device 100 instruct third party security system 160 to automatically notify an emergency response unit 165 (e.g., police department) in response to security device 100 detecting a gunshot (e.g., distress signal). The information included in home security portion 304 may correspond to, at least in part, log data 140, device condition data 142, notification data 144, and/or action data 146 discussed herein with respect to FIG. 2.

Suicide prevention portion 306 may provide the ability to identify one or more special user(s) that may have restricted access to firearm 154 secured within security device 100. More specifically, suicide prevention portion 306 may allow the user of control device 168 to identify specific user(s) who may have more restricted access to firearm 154 secured within security device 100. Suicide prevention portion 306 may allow the user of control device 168 to identify what processes or steps must be taken in order for the identified user(s) to gain access to the firearm. In this non-limiting example, the user identified in suicide prevention portion 306 may be a user that is a potential known risk to themselves and/or others. Turning to FIG. 8B, with continued reference to FIG. 8A, the various options, preferences, and/or settings that may be selectable, adjustable, and/or identifiable for processes relating to allowing or denying access to a user are shown in detail. In the non-limiting example, the user of control device 168 may determine or select different options for a user (e.g., identified as "JC") identified in suicide prevention portion 306 to determine how/if/when firearm 154 may be accessible to the user and what additional steps or processes may be performed. As shown in FIG. 8B, control device 168 depicts that a self-access delay (e.g., predefined wait period) may be imposed on the user identified in the suicide prevention portion 306. Additionally, in the non-limiting example, control device 168 depicts that access for the user identified in suicide prevention portion 306 may require and/or trigger sending a friends/family alert, or require and/or trigger a 2-factor authentication (e.g., requiring an identified party in the list to grant or allow access). However, each of these additional options may be changed and/or alerted by the user of control device 168. In certain embodiments, control device 168 is configured to change a setting relating to access for the item for the requesting user.

Returning to FIG. 8A, smart home portion 308 may provide the ability to edit or adjust how internet of thing (IoT) devices and/or systems in communication with security device 100 may react in response to the detection of certain events and/or inputs from users of their control device 168. For example, smart home portion 308 may allow the user of control device 168 to indicate what IoT devices and/or systems may be engaged, and/or how IoT devices and/or systems may be engaged based on the detection of events (e.g., detected distress signal) and/or inputs from users. For example, smart home portion 308 may provide the user of control device 168 the option to have security device 100 automatically engage or turn on a security camera system in response to security device 100 detecting a gunshot (e.g., distress signal). In some embodiments, the security camera may be located in a home environment. In certain embodiments, the security camera may be a component of the security device. The information included in smart home portion 308 may correspond to, at least in part, device condition data 142, notification data 144, and/or action data 146 discussed herein with respect to FIG. 2.

Turning to FIG. 8C, control device 168 may display a notification 310 provided thereon. That is, and as discussed herein with respect to FIGS. 4-7, control device 168 may receive various notifications 310 from security device 100. In a non-limiting example, notification 310 may be received by control device 168 when a requesting user requests access to the item secured within security device 100. In another non-limiting example, notification 310 may correspond to when the predetermined user(s) and/or third party service receives a notification on control device 168 for deciding whether to allow or deny access to firearm 154 to an authorized, requesting user 10. As shown in FIG. 8C, notification 310 may include information 312 relating to requesting user 10 (e.g., John Smith). Additionally, notification 310 may also provide various selectable options or inputs 314 associated with a response to the notification and/or request made by requesting user 10. That is, at least one selectable inputs 314 may be chosen by the user receiving notification 310 on control device 168 to determine if requesting user 10 will be granted or allowed access to firearm 154 secured within security device 100. Once the receiving user selects or chooses their options and makes a decision regarding requesting user 10, the receiving user may hit a submit button 316, which may transmit the decision back to security device 100. In the non-limiting example, security device 100 may than process the decision and/or feedback provided by control device 168, and may allow access, deny access, trigger a predefined wait period, and/or send a notification to an additional party.

Although shown in FIG. 8C as relating to whether to allow or deny access to firearm 154, it is understood that various notifications may be sent to the predetermined user(s) and/or third party service pertaining to distinct steps or processes, as discussed herein with respect to FIGS. 4-7.

Figure 9:
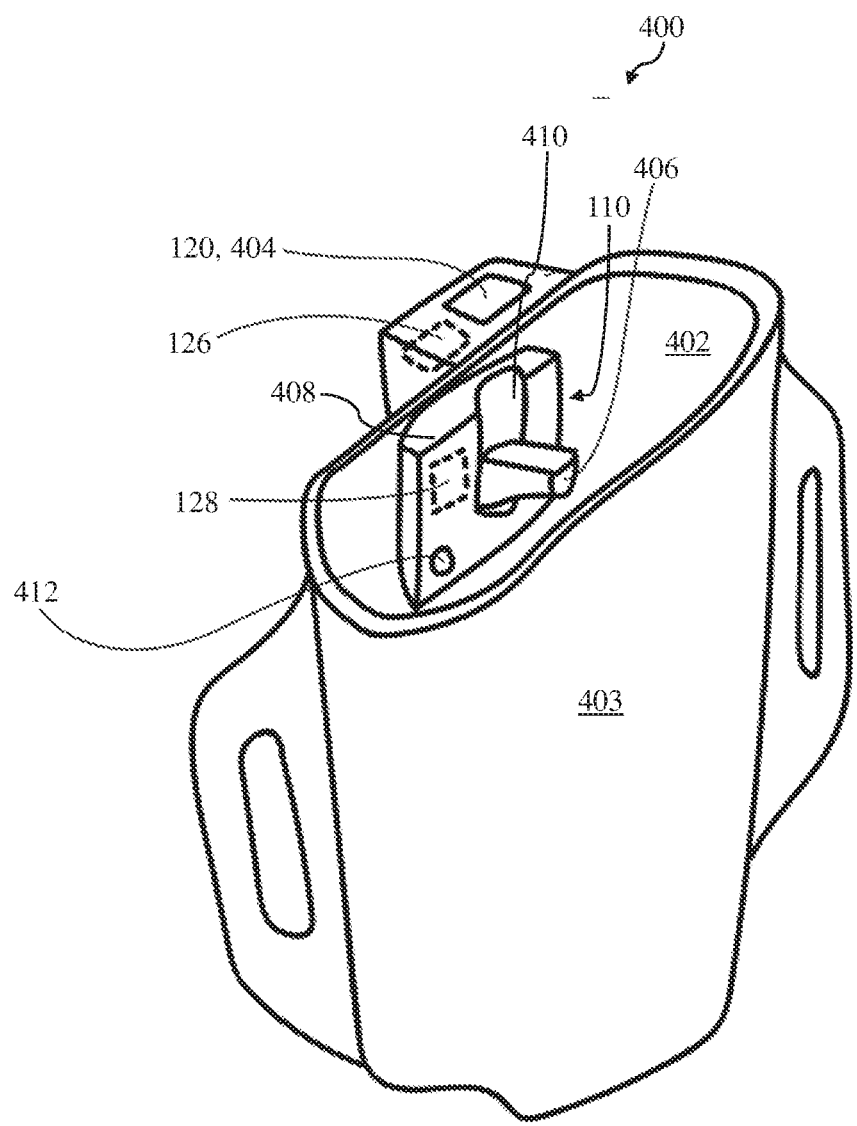
FIG. 9 shows a perspective view of a security holster for a firearm, according to embodiments of the present disclosure.
Figure 10:
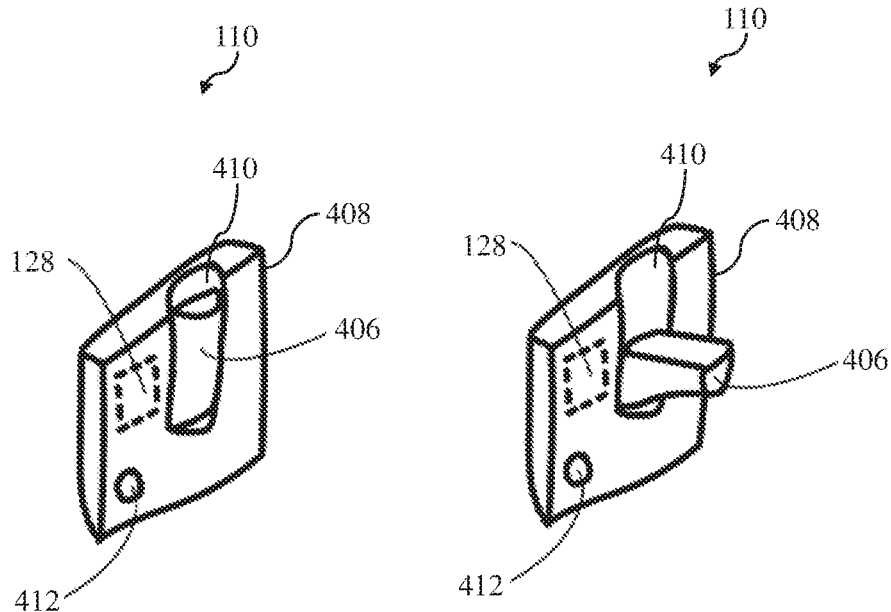
FIG. 10A shows a perspective view of a locking mechanism of the security holster of FIG. 9, according to embodiments of the present disclosure.
FIG. 10B shows another perspective view of a locking mechanism of the security holster of FIG. 9, according to embodiments of the present disclosure.
Figure 11:
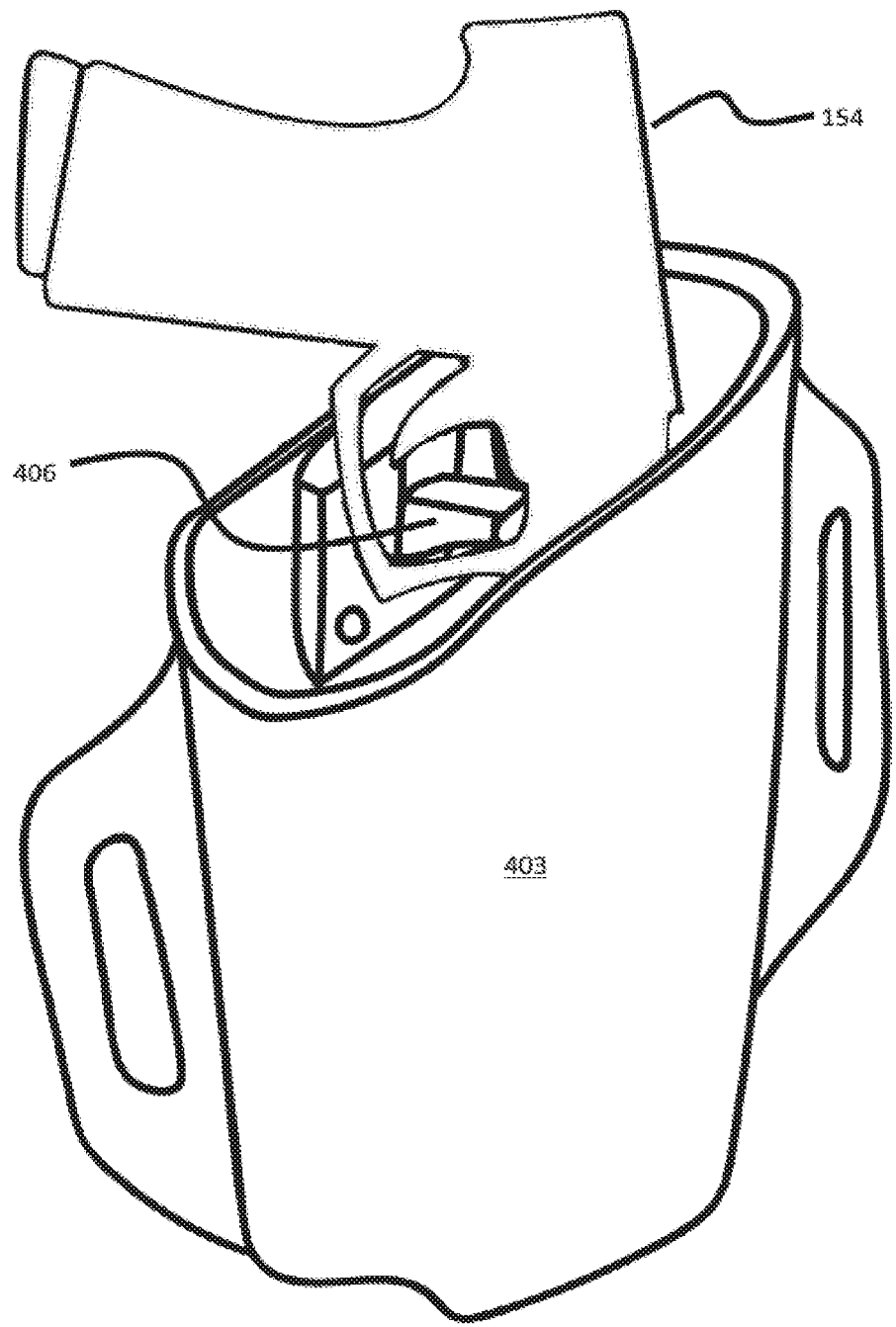
FIG. 11 shows a perspective view of a locking mechanism of the security holster of FIG. 9 in a locked configuration to secure the firearm within the security holster, according to embodiments of the present disclosure.
Figure 12:
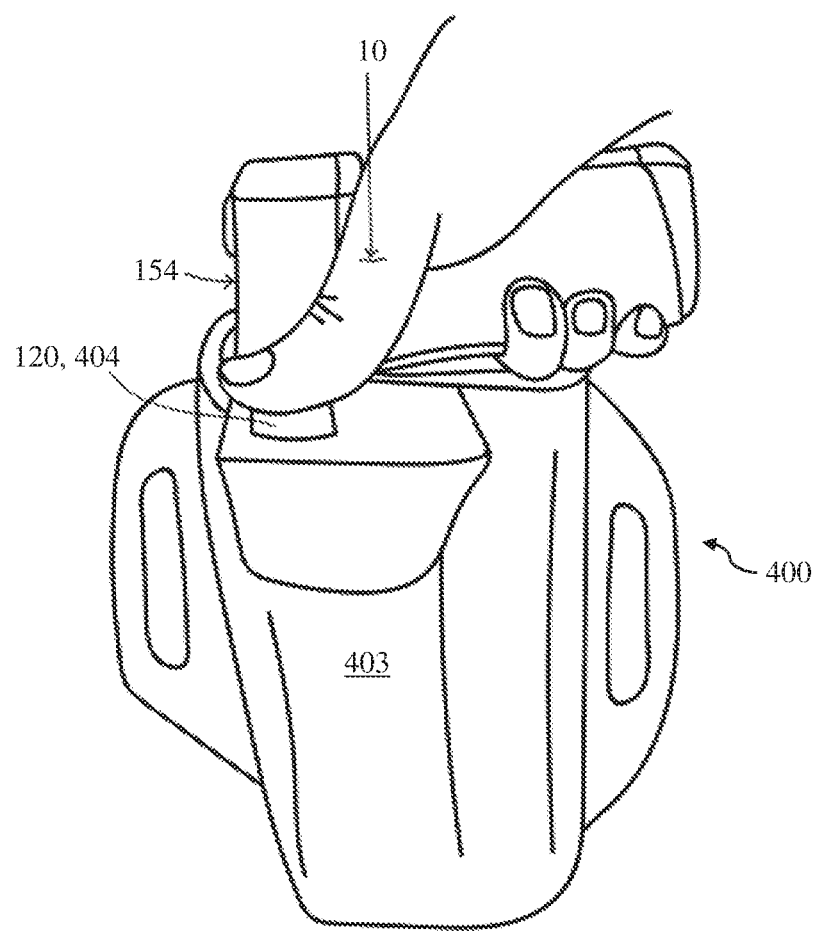
FIG. 12 shows a perspective view of the security holster of FIG. 9 and a requesting user attempting to access a firearm secured within the security holster, according to embodiments of the present disclosure.

Turning to FIGS. 9-12, further embodiments and features of the present disclosure are shown. More specifically, FIG. 9 shows a security device in a form of a security holster 400. FIGS. 10A and 10B each shows a locking mechanism 110 having a pivoting member 406 for securing firearm 154 within security holster 400. FIG. 11 shows a perspective view of locking mechanism 110 of the security holster of FIG. 9 in a locked configuration to secure firearm 154 within the security holster. FIG. 12 shows requesting user 10 of security holster 400 attempting to access or retrieve firearm 154 from security holster 400. Security holster 400 as shown in these figures may be used by law enforcement officers, or any permitted or authorized user, for carrying and safely securing a firearm such as a handgun within. In certain embodiments, security holster 400 may also be used in a home environment for safely securing a firearm within.

It is understood that security holster 400 may include similar components and/or devices as those included in security device 100 discussed herein with respect to FIGS. 1-3. For example, security holster 400 may include locking mechanism 110 for securing firearm 154 (see, FIGS. 9, 10A, 10B and 11) within a recess, opening, and/or cavity 402 formed in a body 403 of security holster 400, and an access authentication assembly 120 included on security holster 400/body 403, adjacent cavity 402 (e.g., see FIG. 9). Additionally, security holster 400 may also include computing device 126 and device condition sensor(s) 128, as similarly described herein with respect to FIGS. 1-3. That is, computing device 126 and device condition sensor(s) 128 may include components and/or functions that may aid in the regulation of operations and/or access to items (e.g., firearm 154) secured within security holster 400. Details of these components and their functions are similarly described with respect to FIGS. 1-3 and have been omitted herein for brevity.

Access authentication assembly 120 of security holster 400 may be configured as a finger/thumb print scanner 404 (hereafter, "scanner") operably connect and/or in communication with computing device 126. As shown in FIG. 9, scanner 404 may be positioned on body 403 of security holster 400 directly adjacent cavity 402. Briefly turning to FIG. 12, with continued reference to FIG. 9, scanner 404 may be positioned on security holster 400 such that requesting user 10 of security holster 400 may reach for firearm 154 and (near) simultaneously provide input to scanner 404 to unlock or access firearm 154. As similarly discussed herein with respect to access authentication assembly 120 of FIGS. 1 and 2, user specific input or information, such as prerecorded finer/thumb prints, may be stored in computing device 126 (e.g., authentication data 138, FIG. 2). As a result, once requesting user 10 of security holster 400 places their thumb/finger on scanner 404, scanner 404 may read the provided finger or thumb print, and computing device 126 may determine if the provided print matches the prerecorded finger or thumb prints. As discussed herein, where the provided print matches the prerecorded finger/thumb prints of requesting user 10, requesting user may be determined as an authorized, requesting user, and locking mechanism 110 may switch between a locked position (FIG. 10B) where access to firearm 154 is blocked, and an unlocked position (FIG. 10A) where firearm 154 is accessible.

Security holster 400 may also include distinct components and/or configurations for similar components of security device 100. For example, locking mechanism 110 of security holster 400 may include a pivoting member 406. As illustrated in FIG. 9, pivoting member 406 may extend at least partially into cavity 402 from a housing 408 positioned within cavity 402 for selectively securing at least a portion of security holster 400 within cavity 402. As shown in FIGS. 9, 10A and 10B, pivoting member 406 may be configured to selectively pivot about one end between a locked or secure position (see, FIGS. 9, 10B and 11), and an unlocked or firearm-accessible position (see, FIG. 10A). As shown in FIGS. 9, 10A and 10B, housing 408 may include a recess 410 formed therein. Recess 410 may receive pivoting member 406 in the unlocked position (see, FIG. 10A). When positioned in the unlocked position, pivoting member 406 may be received and/or positioned within recess 410 and may be substantially flush with housing 408 to prevent obstruction to firearm 154 being removed from cavity 402 of security holster 400. As discussed herein, when an authorized, requesting user 10 provides the necessary input for accessing firearm 154 secured within security holster 400, pivoting member 406 may switch or move from a locked position (see, FIG. 10B) where access to firearm 154 is blocked to an unlocked position (see, FIG. 10A) where firearm 154 is accessible.

Housing 408 may include various components and/or device that may move or adjust pivoting member 406 between the locked and unlocked position. For example, housing 408 may include an electric motor (not shown) in communication with computing device 126 and pivoting member 406 to control the positioning of pivoting member 406 based on operational instructions provided by computing device 126. As illustrated in FIG. 11, to secure firearm 154 within security holster 400, pivoting member 406 may be positioned within and/or may directly contact a trigger guard of firearm 154. More specifically, in the locked position, pivoting member 406 may be positioned between the trigger and trigger guard of firearm 154, or alternatively may contact the trigger guard adjacent the trigger. As a result, firearm 154 may not be accessible or capable of being removed from security holster 400 when pivoting member 406 is in the locked position.

Housing 408 of locking mechanism 110 may also include a device condition sensor 412. Device condition sensor 412 may be any device condition sensor 412 configured to monitor and/or detect if firearm 154 is positioned or locked within security holster 400. Additionally, device condition sensor 412 may detect if firearm 154 is being moved or tampered with when locking mechanism is in a locked position (e.g., pivoting member 406 positioned between a trigger guard and trigger of firearm 154). In non-limiting examples, device condition sensor 412 may be formed as any suitable optical or infrared device condition sensor that can detect placement/presences of firearm 154 within security holster 400 and/or undesirable movement (e.g., tampering, unauthorized attempted access) of firearm 154 positioned within cavity 402 of security holster 400.

Figure 13:
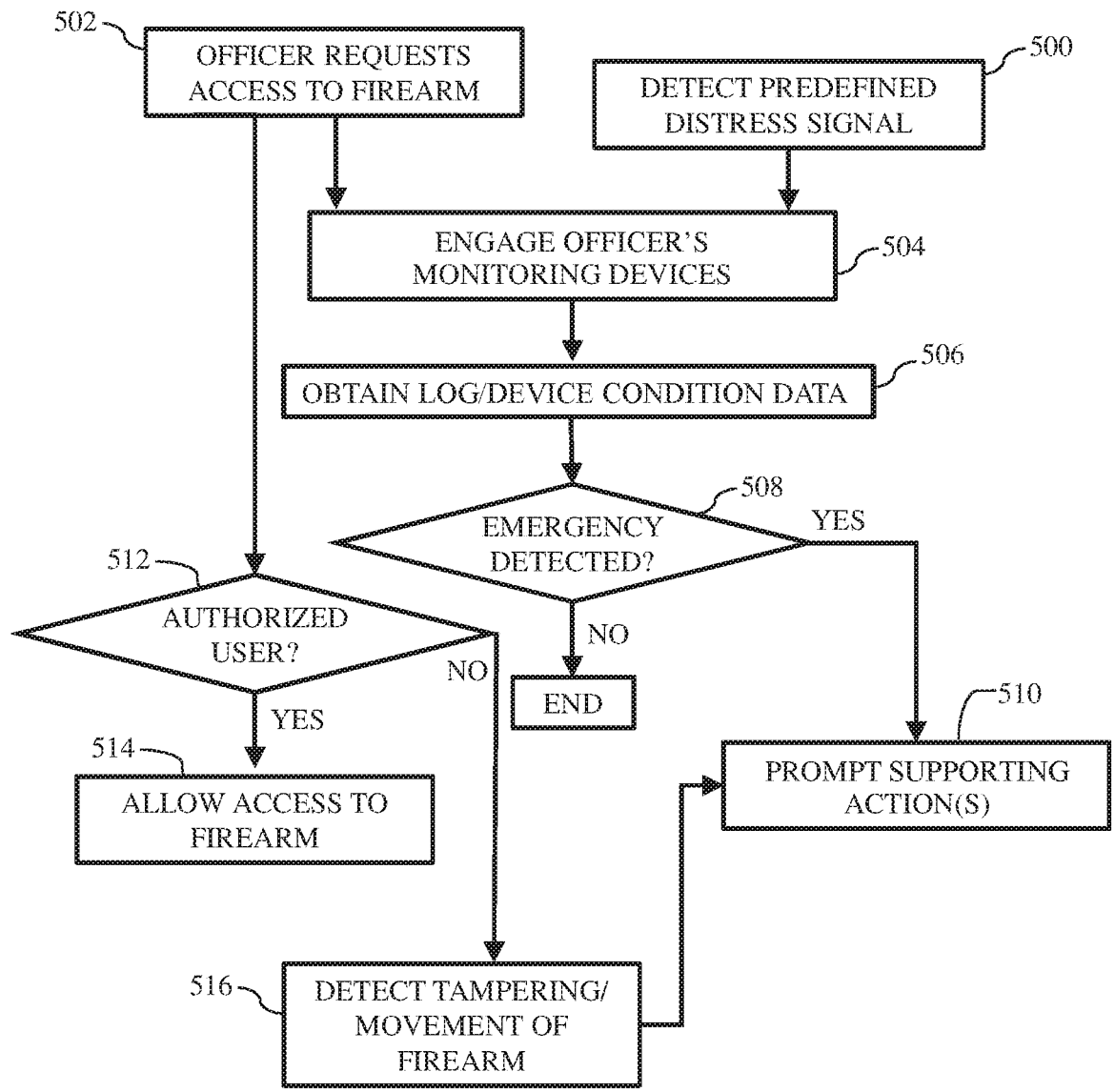
FIG. 13 shows a process for providing access or denying access to a firearm secured within the security holster of FIG. 9, according to embodiments of the present disclosure.

FIG. 13 shows a flow diagram illustrating a non-limiting example of a process for providing access and/or denying access to an item (e.g., firearm 154) secured within security holster 400 during an operation. It is to be understood that similarly numbered and/or named components may function in a substantially similar fashion. Redundant explanation of these components has been omitted for brevity. Additionally, process as shown in FIG. 13 includes additional steps to be performed by security holster 400 based on requesting user 10 attempting to access firearm 154 and/or the detection of distress signals. These processes may be performed, e.g., by at least one computing device 126 included within security holster 400, control devices 168, network 152, and third party service 164 or emergency response unit 165, as described herein with respect to FIGS. 1-3. In other embodiments, these processes may be performed according to a computer-implemented method of regulating operations and/or allow/grant access to firearm 154 using security holster 400 during operation. In still other embodiments, these processes can be performed by executing computer program code on computing device(s) 126 included in security holster 400, control devices 168, and/or network 152 (see, FIGS. 1-3), causing the computing device(s) 126 to regulate operations and/or allow/deny access to firearm using security holster 400, as well as perform additional steps as discussed herein, during operations.

In a non-limiting example, the steps of FIG. 13 may be performed, at least in part, by a law enforcement officer or any other armed emergency responder carrying security holster 400. Additionally, distinct steps may be performed by an emergency response unit that may be associated with the requesting user (e.g., officer), and/or the officer may be a part of the emergency response unit. In other non-limiting examples, the requesting user may be any citizen who may lawfully carry firearm 154 within security holster 400. In this non-limiting example, other steps discussed herein may be performed by an emergency response unit (e.g., police department) and/or a third party service (e.g., personal security company). In some non-limiting examples, as will be described in detail below, the requesting user may be an unauthorized, requesting user (e.g., a criminal) attempting to access firearm 154.

In step 500, a distress signal(s) predefined to be indicative of an emergency may be detected. More specifically, the security holster securing the firearm therein may detect at least one predefined distress signal using the components and/or devices included therein. The predefined distress signal(s) may relate to any emergency-based data or signal(s) that may be detected and/or obtained by components or devices of security holster 400 (e.g., device condition sensor(s), 110 components). For example, the predefined distress signal may include a gunshot sound detected by a microphone or a sound level meter included within security holster 400. In another non-limiting example, the microphone included within security holster 400 may register triggering words, signals, and/or commands, which may be played over the officer's radio system and may be associated with a distress signal (e.g., "code 187"). In other non-limiting examples, the predefined distress signal may be associated with actions and/or triggers from external components, devices, and/or systems that are taken in response to an emergency situation. For example, security holster 400 may be in communication with third party alarm systems, and a distress signal may be detected when the third party alarm system indicates a triggered alarm. The predefined distress signal may also be detected by a microphone, a radio, and/or a body camera on the officer—any or each of these components in communication with security holster 400 and/or the components or devices included therein. In any of the non-limiting examples, security holster 400 may detect the predefined distress signal by continuously querying the components and/or constantly engaging the devices and/or components configured to detect the predefined distress signal.

Step 502 may be performed simultaneous to, before, or subsequent to step 500 being performed. Additionally, step 502 may be performed completely independent of performing step 500. In step 502, a requesting user (e.g., a law enforcement officer) may request access to the firearm secured and/or locked within security holster 400. More specifically, a user of security holster 400 containing or securing the firearm may request access to firearm 154 by interacting with security holster 400. The requesting user may request access to firearm 154 by interacting with an access authentication assembly included within security holster 400. In a non-limiting example, the access authentication assembly may include a thumb or finger print scanner or reader. The requesting user may request access by interacting with and/or providing authentication data or input to the access authentication assembly of security holster 400 (e.g., placing their thumb/finger on the scanner). The authentication data or input may be provide to the computing device of security holster 400 for further processing and/or verification.

In step 504, one or more monitoring device(s) and/or system(s) of the user (e.g., the law enforcement officer) may be engaged. More specifically, and in response to performing steps 500 and/or 502, the user monitoring device(s) may be engaged, operational, and/or activated. The user monitoring devices may be activated automatically by the security holster. In a non-limiting example, the user monitoring devices may be automatically activated by the security holster in response to the security holster detecting the predefined distress signal (e.g., step 500) and/or the user (e.g., the officer) requesting access to the firearm (e.g., step 502). The user monitoring devices may include various devices and/or systems in communication with the security holster that may be engaged, operational, and/or activated by the security holster and may capture data or information relating to the user/officer. For example, the user monitoring devices may include, but are not limited to, a body camera, an audio recording system, a two-way radio system, and the like. In another non-limiting example, the engaging of the user monitoring devices may be triggered based an emergency response unit associated with the user/officer, who may be receiving information or data from the security holster or the user/officer.

In step 506, device condition data may be obtained. More specifically, the security holster securing the firearm within may gather and/or obtain device condition data. In addition to, or alternative to the security holster, the device condition data may be obtained from the engaged officer's monitoring device(s) and/or system(s). The device condition data may relate to any data captured and/or obtained by components or devices of the security holster (e.g., device condition sensor(s), I/O components) and/or the officer's monitoring device/system in communication with the security holster. For example, the obtained device condition data may include data associated with at least one of the security holster, environment in proximity to the security holster. Data associated with environment in proximity to the security holster may include, but are not limited to, recorded ambient noises such as alarms or gunshots surrounding the security holster/officer, direct dispatch calls to the officer's radio, identified weapons/items detected by a (smart) body camera on the officer, and the like. In a non-limiting example, the device condition data may further include log data similarly described with respect to FIGS. 4-7.

In step 508, it may be determined if an emergency exists and/or if an emergency has been detected. Specifically, an emergency response unit (e.g., police department) that may be associated with the requesting officer, in communication with the security holster, and/or who receives the obtained log/device condition data in step 506 may provide input to either indicate that an emergency or emergency situation exists or not. The emergency response unit may provide the input, and more specifically the detection of an emergency, via the control device that received the log/device condition data, and prompt to make a decision regarding the emergency. Where the emergency response unit indicates that an emergency or emergency situation exists ("YES" at step 508), the processes may proceed to step 510. That is, where the emergency response unit determines that an emergency or emergency situation exists based on the obtained data, the process may proceed to step 510. Conversely, where the emergency response unit indicates that an emergency or emergency situation does not exist ("YES" at step 508), the processes may end, and/or the emergency response unit may continue to obtain the log/device condition data to reevaluate if an emergency exists.

In step 510, additional support action(s) may be prompted. That is, where the emergency response unit indicates that an emergency exists or emergency situation has been detected ("YES" at step 508), the security holster and/or the emergency response unit may prompt additional support actions for the officer to be taken by a pre-determined support group. The pre-determined support group may include, but is not limited to, a primary user, a designated user, a third party service, a third party system, an emergency response unit, an internet-of-things (IoT) device, or any combination thereof. In a non-limiting example, the security holster and/or the emergency response unit may provide additional support, and/or back-up to the officer having the security holster. In another non-limiting example, the emergency response unit may provide additional information, instruction and/or data to the officer (e.g., via two-way radio system). In certain embodiments, the information may be requested by the officer. In some embodiments, the information may be related to the distress signal and/or any other information that may be pertinent to the officer in the emergency. For example, where the officer is attempting to apprehend a criminal, the emergency response unit may provide information about the criminal, such as a name or an address, based on data or information obtained by the officer's monitoring device and/or system (e.g., body camera).

Simultaneous or substantially simultaneous to detecting an emergency, steps 512-516 may be performed. In step 512, it may be determined if the user requesting access in step 502 is an authorized user of the security holster. Specifically, the computing device of the security holster may receive authentication data of the requesting user provided or collected by the access authentication assembly, and may determine if the requesting user is an authorized user and/or a user who has access to the firearm included in the security holster. The computing device may compare the authentication data of the requesting user with predetermined authentication data corresponding to the authorized user to determine if the requesting user is the authorized user, and therefore allowed access to the firearm. Continuing the non-limiting example above, where the access authentication assembly includes a thumb/finger print scanner, the computing device of the security holster may compare the requesting user's scanned thumb/finger prints with predetermined authentication thumb/finger prints to determine if the requesting user is an authorized user. Where the authentication data from the requesting user matches authentication data of the authorized user ("YES" at step 512), the processes may proceed to step 514. Conversely, if it is determined that the requesting user's input does not match authentication data ("NO" at step 512), the processes may proceed to step 516 (and subsequently, steps 510).

In step 514, the authorized, requesting user (e.g., the officer) may be allow or granted access to the firearm included in the security holster. That is, the security device may unlock and/or open, and the authorized, requesting officer of the security holster may be allowed access to the firearm included or secured within the security holster. When access to the firearm is allowed, the security holster may instantly unlock and/or open to indicate that the authorized, requesting user or officer is granted access to the firearm. In addition to unlocking, the security holster may provide an output or notice that indicate that the authorized, requesting officer is now granted or allowed access to the firearm. For example, a speaker included in the security holster may play an "access tone" indicating that the security holster is now unlocked, and the firearm is now accessible.

In response to the security holster, and more specifically the computing device included therein determining the requesting user is not an authorized user (e.g., "NO" at step 512), the process may proceed to step 516. In step 516, the security holster, more specifically, various components included therein (e.g., device condition sensors) may detect and/or determine if the requesting user is tampering and/or moving the security holster and/or the firearm secured therein. In a non-limiting example, the computing device of the security holster may determine that the unauthorized, requesting user is tampering with the security holster and/or the firearm by attempting multiple incorrect inputs on the access authentication assembly of the security holster. In another non-limiting example, the device condition sensor(s) and/or I/O components of the security holster may be used to determine if the unauthorized, requesting user is tampering and/or attempting to move the security holster or the firearm therein. For example, a device condition sensor may be positioned on the body of the security holster. In a non-limiting example, an optical device condition sensor positioned within the housing of the locking mechanism for the security holster may detect or determine if a user is attempting to pull the firearm from the holster without attempting to be authenticated. This may be an instance where an officer (authorized user) is wrestling with a criminal (e.g., unauthorized user), and the criminal is attempting to access the officer's gun. In either non-limiting example, the security holster may determine that the firearm is being tampered within.

In response to determining that the firearm and/or the security holster are being tampered with, the process may proceed back to step 510, and additional action(s) may be prompted. As discussed herein, when it is detected that the firearm and/or the security holster is being tampered with, the security holster and/or the emergency response unit associated with the officer having the security holster may request and/or indicate the need for back-up and/or support. As such, in step 510, additional action may be prompted, and support may be provided to the officer whose security holster and/or firearm is being tampered with.

Various additional aspects of the present disclosure and additional features of embodiments of the present disclosure are described herein below. It is to be understood that these examples are provided for the illustrative purpose only and are not intended to be limiting the scope of the present disclosure.

An additional aspect of the disclosure provides a method of regulating operations of a firearm security system, the method including: obtaining data relating to the device and a space within the surrounding proximity of security device 100, 400, the data including at least one of: when some authorized individual attempts access to the firearm, upon which there is a response of at least one of: the control system notifies another person or service that security device 100, 400 has been unlocked by the authorized individual, the control system communicates with another person or service to approve of the access before the security devices unlocks firearm, the control system waits a pre-established time delay set by the user before unlocking the firearm, an acoustic signal relating to sound of distress, a spoken word, or gunshot, and responding with at least one of: communicating with the user or a service alerting that there is cause for emergency at the given location of security device 100, 400, communicating with other Internet-of-Thing (IoT) devices such as smart lights, cameras, and speakers to turn on lights, record and save footage at time of incident, sound an alarm, recognition of nearby physical presence and/or physical tampering through device condition sensors that determine a failed access attempt, shaking, impact, or other means of forceful entry and responding with at least one of: communicating with the user that physical tampering of security device 100, 400 is taking place, capturing a data log of the time of instances in which access is attempted.

Another aspect of the disclosure provides a method of regulating operations of a firearm security system as described in the first aspect, primarily in the focus of a use-case scenario of security device 100, 400 attached officer's belt, with functions including: preventing an unauthorized individual from grabbing the firearm from the officer while the officer's firearm is in a secure holstered state, gathering data from security device 100, 400 and surrounding environment in the vicinity of security device 100, 400 through the use of device condition sensors present in the device, including at least one of these features as: location, temperature, gunshot detection, drawing the firearm, call for backup, body camera footage, officer's physical state, and communicating relevant data to a monitoring person or service that reviews the data and body camera footage and sends an appropriate response which may be at least one of: sending backup officers to location, directions on course of action, etc.

In some examples, security device 100, 400 may communicate with others devices (e.g., control device 168) using a network connection. Security device 100, 400 may communicate to a server that then contacts other devices, or it may communicate directly with another device (e.g., a smartphone).

In some examples, security device 100, 400 may contact an authorized third party for permission to unlock the safe. An authorized third party may be any persons or services authorized to monitor the device (such as a caretaker, support group member, sponsor, family member, law enforcement, government agency or additional service providers like private security). In some examples, third party 160 may be a friend, family member, health expert, physician, or service.

Security device 100, 400 may detect unauthorized attempts at unlocking. In some examples, when an incorrect fingerprint is detected after some predetermined number of attempts, a timeout period may be engaged where security device 100, 400 will not allow local unlocking for some period of time (e.g., one, six, twelve or twenty-four hour). When tampering is detected by security device 100, 400, it may send a notification to the user (e.g., primary user) and/or an authorized third party. Security device 100, 400 may connect directly to a user's phone via Bluetooth, Wi-Fi, a cellular signal, or any other wireless means. Security device 100, 400 may also connect to a server in order to log and relay the message to the aforementioned authorized parties.

In some examples, security device 100, 400 may have various features that may be adjusted through use of a remote tool, such as a smartphone or web app. The user of the app (e.g., the owner of security device 100, 400) may have different permission levels allowed by a remote administrator (e.g., an authorized third party). An example feature that may be adjusted is lockout conditions. Security device 100, 400 may be configured to only recognize certain fingerprints, codes, RFIDs, or other forms of identification (e.g., any unique biomarker such as face, voice, heart rhythm). Security device 100, 400 may also be configured to unlock only when several conditions are satisfied beyond just the correct fingerprint. One such condition may be a schedule or certain times of day in which the device is normally allowed to be unlocked. Another example is mood detection (e.g., heartrate, blood pressure) that has to be under a threshold to ensure the user is calm. Other example features that may be adjusted are unlock or tampering alerts. Authorized third parties may be alerted to tampering or unauthorized access via various means (e.g., smartphone app alert, text, phone call)

Security device 100, 400 may optionally be connected to and integrate with other IoT devices or services. In some examples, it may connect to a home security system and activate it when the device is unlocked or tampered with, or if a gunshot is detected. This may allow it to sound an alarm, record security footage, or trigger any other feature of the security system as needed. Security device 100, 400 may also integrate with other traditional smart-home services, such as those provided by Google, Amazon, Apple, and traditional home security services. These services may provide functionality like sound or video recording, or may issue a recorded warning to a potential intruder.

In some examples, security device 100, 400 may contact emergency services, such as local dispatch (911), or home security services in the event that a gunshot is detected. The device may also be triggered by a verbal command from an authorized user, or by listening for sounds of distress after the device is unlocked. Security device 100, 400 may listen through an integrated sound sensor such as a microphone, or it could make use of connected devices capable of listening such as smart assistant services (e.g., Google Home, Google Assistant, Amazon Alexa, Siri, etc.).

In some examples, security device 100, 400 may provide a mechanical enclosure, mechanical shroud, to include a locking mechanism prevent physical access to an object or an item (e.g., a firearm, a weapon, or any other device or object that a user wants to secure). The enclosure may prevent access to the entire object, or just a specific element of the object (e.g., a firearm trigger).

In some examples, security device 100, 400 may be configured to register and recognize users. The device may allow different permissions per user, which may be administered by a user with higher privileges (e.g., the device owner, primary user or an authorized party). Security device 100, 400 may have memory and storage to allow it to store user credentials and permissions locally on the device. These settings may then be changed by a connected phone app, or remotely administered by an authorized party. User credentials may include a fingerprint or other biomarkers, a passcode entered in the phone app or directly on the device, or a spoken pass code entered in the phone app or directly on the device. Each user may have one or more unique credentials, and these may be associated with that user's settings and permissions.

Security device 100, 400 may maintain a log of events that occur on the device, along with a timestamp of when the events occurred. These events may include locking and unlocking, attempts at tampering, new user being added, user being removed, changes to two-factor authentication, or changes to any other configurable settings. Security device 100, 400 may periodically or in real-time as events occur, send the log to the smartphone app or a remote server. This log may be reviewed by authorized third parties or users with administrative privileges, as well as law enforcement. The log may be a way to see and audit how the security device has been used.

In some examples, security device 100, 400 may interface with a body camera, or other connected security cameras when certain events occur, such as the safe being unlocked. It can connect wirelessly to the camera directly, through a hub, or through commands issued to a remote server. The camera footage may then be timestamped and streamed and/or recorded and sent to authorized parties. The camera footage may be stored locally on the camera, sent to the smartphone app, or sent to a remote server.

In some examples, security device 100, 400 may listen for spoken key words or phrases, or certain noises (e.g., a gunshot) in order to decide to send an alert to an authorized third party or information center. Video footage or sound recordings captured by a firearm security device, or a separate connected device (e.g., a body camera) may also be sent to an authorized third party or information center for use in making decisions. Different events may be prioritized by an authorized third party or information center. In some examples, alerts sent by security device 100, 400 are prioritized based on certain criteria (e.g., estimated time need to respond, perceived danger to the user of security device 100, 400). An authorized third party or information center may use machine learning in order to make prioritization decisions, and to train its learning model to make decisions in the future.

In some examples, a central information center may be fed information on critical field situations that is filtered and assigned a priority level by an A.I. (e.g., machine learning) program. The information center may also communicate back real-time directions based on live footage and data. In some examples, Officer's location, health, and other data may be readily available for making informed decisions.

In some examples, a control system may log the identity of an officer using a specific smart holster and can track location. Security device 100, 400 may store and send data on when firearm is removed. Status of firearm removal may cause a body camera footage to start streaming to an information center. Key words, phrases or gunshots may be registered and flagged by an AI-enabled program which then sends over data and live footage ranked on an assigned priority level to the information center.

Security device 100, 400 may be an enclosed device, an open locking mechanism, a holster, and/or other depiction that serves the function of securing a firearm against unauthorized access through non-limiting means of mechanical, electromechanical, or other security methods. A control device 168 may be used to send and/or receive data from the user 10 and/or security device 400. In some examples, a control device may be a smartphone, laptop, or other device that can receive and/or send signals and/or data. Security device 100, 400 may contain device condition sensors that can detect and/or emit sound, force, movement, and light, while not limited to the descriptive examples provided. In some examples security device 100, 400 may communicate to one of a hub, network, internet, or server via one of a Wi-Fi, internet, Bluetooth, cellular signal network, Near-Field-Communication (NFC), or any other wireless protocol.

In some examples, user 10 may become an authorized individual who is able to unlock firearm 154 from security device 100, 400. Security device 100, 400 may be able to secure firearm 154 and prevent unauthorized access and/or theft. FIGS. 4-7 are process flowcharts which depicts example control systems. With the use of control device 168, user 10 may be able to set a feature that allows security device 100, 400 to send a signal through communication network 152, which in turn is sent to control device 168 of third party 160. When user 10 attempts removal of firearm 154 from security device 100, 400, security device 100, 400 may send a signal that is delivered to third party 160 which may be a notification that security device 100, 400 has been unlocked by user 10 or security device 100, 400 may require a reciprocated signal by third party 160 that approves or disapproves of whether security device 100, 400 unlocks firearm 154. This signal may be sent back using control device 168 through the communication network to security device 100, 400 upon which an approval signal allows firearm 154 to be unlocked from security device 100, 400 and a disapproval signal does not unlock firearm 154 from security device 100, 400. The function of this control system may allow a user who may have a higher risk of committing suicide to communicate to third party 160 or allow third party 160 to manage the ability for user 10 to access firearm 154 from security device 100, 400. This creates a system of checks and/or information sharing that can potentially save the life of a user who may momentarily attempt to commit suicide.

It is to be understood that computing device 126 of security device 100 may be implemented as a computing system or a computer program product stored on a computer readable storage medium. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combinations thereof. More specific examples of the computer readable storage medium include, but are not limited to, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combinations thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include, but is not limited to, copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present disclosure may include, but are not limited to, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, but not limited to, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Descriptions are provided herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device(s) to cause a series of operational steps to be performed on the computer, other programmable apparatus or other device(s) to produce a computer implemented process, such that the instructions which execute on the computer, other programmable apparatus, or other device(s) implement the functions/acts specified in the flowchart and/or block diagram block or blocks.

Furthermore, it is to be understood that the computing device of the security device of the present disclosure or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, and then install the proxy server code on the proxy computer. The components may be transmitted to the proxy server and then be stored on the proxy server.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A security device comprising:
   an enclosure including a cavity for storing a firearm therein;
   a cover operably coupled to the enclosure and configured to block access to the cavity where the firearm is stored;
   a locking mechanism coupled to the cover and the enclosure and configured to secure the cover to the enclosure;
   an access authentication assembly included within and exposed on the enclosure, and configured to receive or provide authentication data for determining if a requesting user requesting access to the firearm is an authorized user;
   a device condition sensor configured to provide device condition data associated with at least one of the security device and an environment in proximity to the security device; and
   a computing device operably coupled to the locking mechanism, the access authentication assembly, and the device condition sensor, and configured to regulate the security device between a locked configuration where access to the firearm is denied and an unlocked configuration where the firearm is accessible,
   wherein in response to determining that the requesting user requesting access to the firearm is the authorized user, the computing device is configured to:
      trigger a predefined wait period during which the access to the firearm is denied;
      notify a pre-determined support group that the requesting user is requesting access to the firearm;
      receive an approval or a denial feedback if the pre-determined support group approves or denies access to the firearm to the requesting user; and
      in response to receiving the approval feedback, allow the requesting user access to the firearm, wherein the pre-determined support group comprises a second user different from the requesting user.

2. The security device of claim 1, wherein the access authentication assembly is configured to receive or provide authentication data from both the requesting user and the authorized user for determining if the authentication data from the requesting user and the authentication data corresponding to the authorized user match.

3. The security device of claim 1, wherein the access authentication assembly includes a mechanical key, a keypad, a fingerprint scanner, a radio frequency identification (RFID) reader, a device-to-device reader, a smartphone, a wearable device, a biometric reader, a face recognition device, a voice recognition device, a heartrate monitor, or any combination thereof.

4. The security device of claim 1, wherein the device condition sensor includes a global positioning system (GPS), a force device condition sensor, an accelerometer, a sound detection device condition sensor, a frequency detection sensor, a microphone, a camera, a speaker, or any combination thereof.

5. The security device of claim 1, wherein the computing device is configured to determine, based on the device condition data, if the security device is tampered with while the security device is in the locked configuration.

6. The security device of claim 1, wherein the computing device includes a processor configured to capture log data including one or more timestamped actions of locking, unlocking, accessing, or tampering with the security device, or any combination thereof.

7. The security device of claim 1, wherein the pre-determined support group further comprises at least one of a primary user, a designated user, a third party service, a third party system, an emergency response unit, an internet-of-things (IoT) device, or any combination thereof, and wherein the primary user and the designated user are each different from the requesting user.

8. A security device comprising:
an enclosure including a cavity for storing a firearm therein;
a cover operably coupled to the enclosure and configured to block access to the cavity where the firearm is stored;
a locking mechanism coupled to the cover and the enclosure and configured to secure the cover to the enclosure;
an access authentication assembly included within and exposed on the enclosure, and configured to receive or provide authentication data for determining if a requesting user requesting access to the firearm is an authorized user;
a device condition sensor configured to provide device condition data associated with at least one of the security device and an environment in proximity to the security device; and
a computing device operably coupled to the locking mechanism, the access authentication assembly, and the device condition sensor, and configured to regulate the security device between a locked configuration where access to the firearm is denied and an unlocked configuration where the firearm is accessible,
wherein in response to determining that the requesting user requesting access to the firearm is the authorized user, the computing device is configured to trigger a predefined wait period during which the access to the firearm is denied, and
wherein the at least one of the computing device, the device condition sensor, or the access authentication assembly is configured to communicate to a pre-determined support group via the network and a control device operably coupled to the network and the pre-determined support group, the control device configured to perform actions of:
receiving a notification when the requesting user requests access to the firearm;
sending a feedback to the security device if the pre-determined support group approves or denies access to the firearm to the requesting user; and
changing a setting relating to access for the firearm for the requesting user.

9. A method for regulating access to a firearm secured within a security device, the method comprising:
providing a security device comprising:
an enclosure including a cavity for storing a firearm therein,
a cover operably coupled to the enclosure and configured to block access to the cavity where the firearm is stored,
a locking mechanism coupled to the cover and the enclosure and configured to secure the cover to the enclosure,
an access authentication assembly included within and exposed on the enclosure, and configured to receive or provide authentication data for determining if a requesting user requesting access to the firearm is an authorized user,
a device condition sensor configured to provide device condition data associated with at least one of the security device and an environment in proximity to the security device, and
a computing device operably coupled to the locking mechanism, the access authentication assembly, and the device condition sensor, and configured to regulate the security device between a locked configuration where access to the firearm is denied and an unlocked configuration where the firearm is accessible;
determining if a requesting user requesting access to the firearm is the authorized user; and
in response to determining the requesting user requesting access to the firearm is the authorized user, the method further includes:
triggering a predefined wait period during which the access to the firearm is denied;
notifying a pre-determined support group that the requesting user is requesting access to the firearm;
receiving an approval or a denial feedback if the pre-determined support group approves or denies access to the firearm to the requesting user; and
in response to receiving the approval feedback, allowing the requesting user access to the firearm,
wherein the pre-determined support group comprises a second user different from the requesting user.

10. The method of claim 9, further comprising: in response to triggering the predefined wait period, allowing the requesting user access to the firearm at the expiration of the predefined wait period.

11. The method of claim 9, wherein the predefined wait period is at least 5 minutes.

12. The method of claim 9, wherein the pre-determined support group further includes at least one of a primary user, a designated user, a third party service, a third party system, an emergency response unit, an internet-of-things (IoT)

device, or any combinations thereof, and wherein the primary user and the designated user are each different from the requesting user.

13. The method of claim 9, further comprising:
in response to receiving the denial feedback, maintaining the security device in the locked configuration to prevent access to the firearm.

14. The method of claim 9, wherein the receiving the approval or the denial feedback further includes receiving the approval or the denial feedback from a control device operably coupled to and in electronic communication with the security device.

15. The method of claim 9, further comprising:
in response to determining that the requesting user requesting access to the firearm is not the authorized user, notifying the pre-determined support group that an unauthorized requesting user is requesting access to the firearm.

16. The method of claim 9, further comprising:
in response to determining that the requesting user is not the authorized user, detecting at least one of tampering or movement of the security device based on a log data, the authentication data, a device condition data, or any combination thereof, wherein the log data and the device condition data are obtained by the security device, a device condition sensor, or both.

17. The method of claim 9, wherein the determining if the requesting user is the authorized user further comprises determining if the authentication data collected from the requesting user and the authentication data corresponding to the authorized user match.

18. A method for regulating access to a firearm secured within a security device, the method comprising:
providing a security device comprising:
an enclosure including a cavity for storing a firearm therein,
a cover operably coupled to the enclosure and configured to block access to the cavity where the firearm is stored,
a locking mechanism coupled to the cover and the enclosure and configured to secure the cover to the enclosure,
an access authentication assembly included within and exposed on the enclosure, and configured to receive or provide authentication data for determining if a requesting user requesting access to the firearm is an authorized user,
a device condition sensor configured to provide device condition data associated with at least one of the security device and an environment in proximity to the security device, and
a computing device operably coupled to the locking mechanism, the access authentication assembly, and the device condition sensor, and configured to regulate the security device between a locked configuration where access to the firearm is denied and an unlocked configuration where the firearm is accessible;
determining if a requesting user requesting access to the firearm is the authorized user;
in response to determining the requesting user requesting access to the firearm is the authorized user, the method further includes:
triggering a predefined wait period during which the access to the firearm is denied,
notifying a pre-determined support group that the requesting user is requesting access to the firearm, and
receiving an approval or a denial feedback if the pre-determined support group approves or denies access to the firearm to the requesting user, wherein, in response to receiving the approval feedback, allowing the requesting user access to the firearm; and
in response to receiving a distress signal predefined to be indicative of an emergency, the method further includes:
activating one or more internet of things (IoT) devices in response to receiving the distress signal predefined to be indicative of the emergency,
notifying the pre-determined support group that the predefined distress signal is received,
receiving an indication from the pre-determined support group, whether the emergency exists, and
in response to receiving an indication that the emergency exists, notifying an emergency response unit.

19. The method of claim 18, further comprising:
subsequent to notifying the emergency response unit and in response to determining the requesting user is the authorized user, allowing access to the firearm.

* * * * *